United States Patent
Iwashita

(10) Patent No.: US 10,911,619 B2
(45) Date of Patent: Feb. 2, 2021

(54) INPUT DEVICE, IMAGE FORMING APPARATUS, AND NON-TRANSITORY COMPUTER READABLE MEDIUM FOR ALLOCATING A FUNCTION TO A VISUALLY UNASCERTAINABLE DETECTION REGION

(71) Applicant: FUJI XEROX CO., LTD., Tokyo (JP)

(72) Inventor: Hideharu Iwashita, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 159 days.

(21) Appl. No.: 15/938,580

(22) Filed: Mar. 28, 2018

(65) Prior Publication Data

US 2018/0288249 A1 Oct. 4, 2018

(30) Foreign Application Priority Data

Apr. 4, 2017 (JP) ................. 2017-074374

(51) Int. Cl.
*H04N 1/00* (2006.01)
*G06F 3/042* (2006.01)
*G06F 3/0488* (2013.01)

(52) U.S. Cl.
CPC ......... *H04N 1/00411* (2013.01); *G06F 3/042* (2013.01); *G06F 3/0421* (2013.01); *G06F 3/04886* (2013.01); *H04N 1/00392* (2013.01)

(58) Field of Classification Search
None
See application file for complete search history.

(56) References Cited

U.S. PATENT DOCUMENTS

| | | | |
|---|---|---|---|
| 7,903,097 B2 | 3/2011 | Watari | |
| 8,451,237 B2* | 5/2013 | Sleeman | G06F 3/0416 178/18.01 |
| 2011/0317192 A1* | 12/2011 | Fukuoka | H04N 1/00411 358/1.13 |
| 2015/0293694 A1* | 10/2015 | Bozzini | G06F 3/0482 715/773 |

FOREIGN PATENT DOCUMENTS

| | | |
|---|---|---|
| JP | S60-95644 U | 6/1985 |
| JP | 2004-054589 A | 2/2004 |
| JP | 2007-65767 A | 3/2007 |
| JP | 2012-133453 A | 7/2012 |
| JP | 2016-122471 A | 7/2016 |
| JP | 2016-170710 A | 9/2016 |
| WO | 2015/112405 A1 | 7/2015 |

OTHER PUBLICATIONS

Oct. 20, 2020 Office Action issued in Japanese Patent Application No. 2017-074374.

* cited by examiner

*Primary Examiner* — Thomas D Lee
(74) *Attorney, Agent, or Firm* — Oliff PLC

(57) ABSTRACT

An input device includes a display on which a work screen is displayed, a detector that optically detects an operation input, and an allocating unit that variably allocates a second operational function to a detection region of the detector. The second operation function is different from a first operational function an allocation position of which is visually ascertainable.

17 Claims, 33 Drawing Sheets

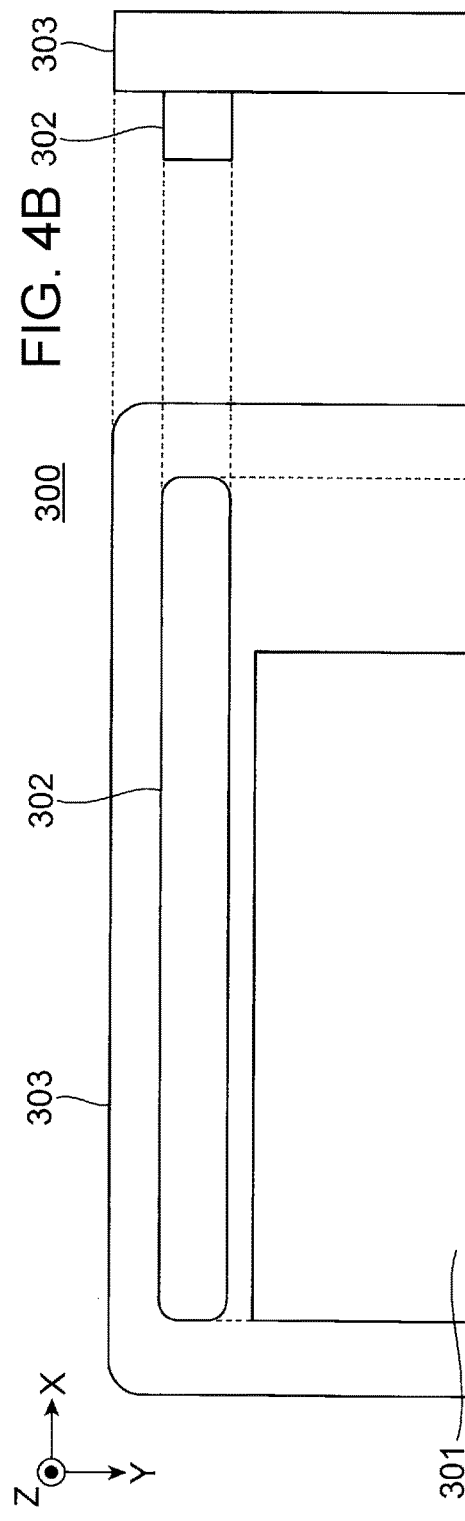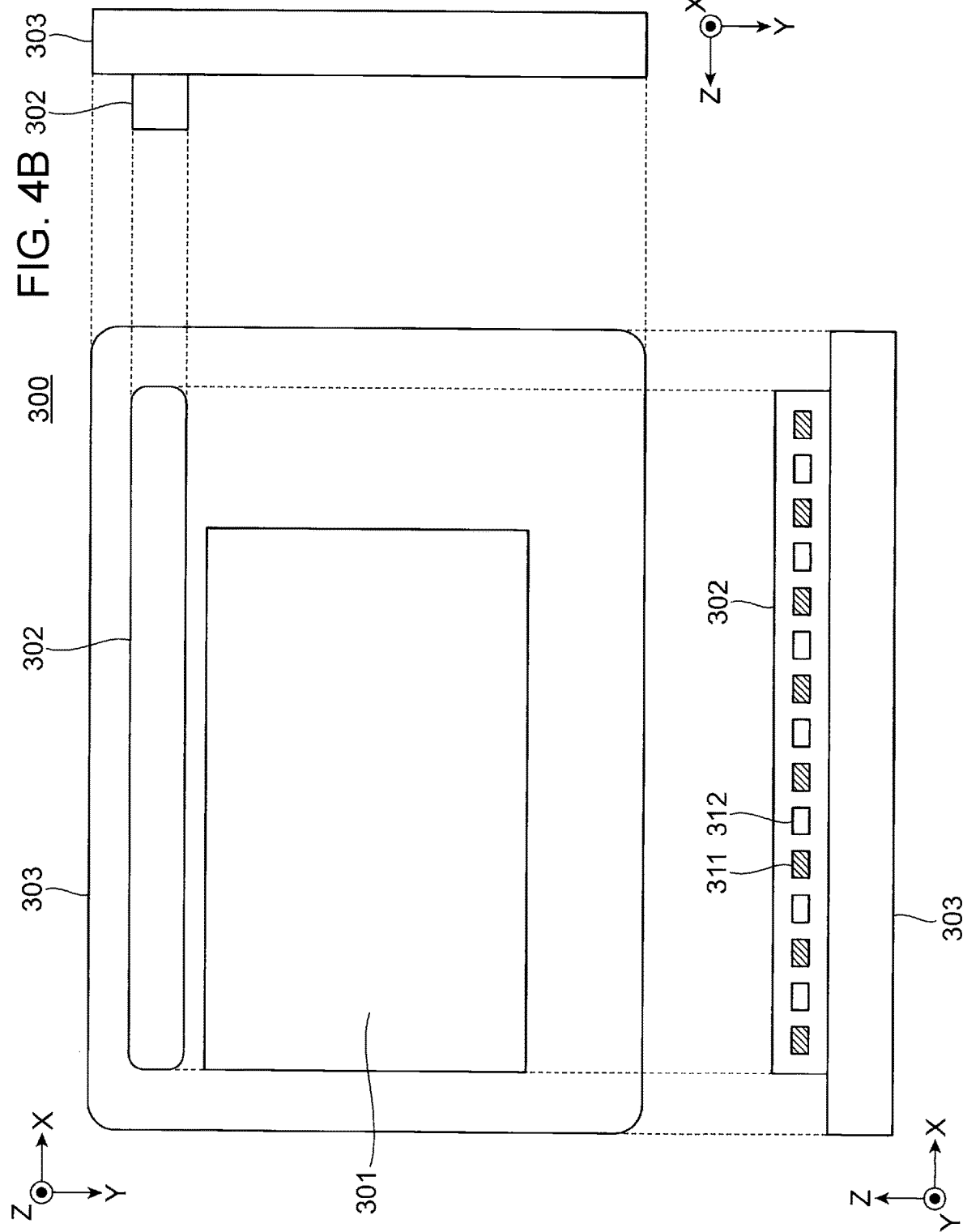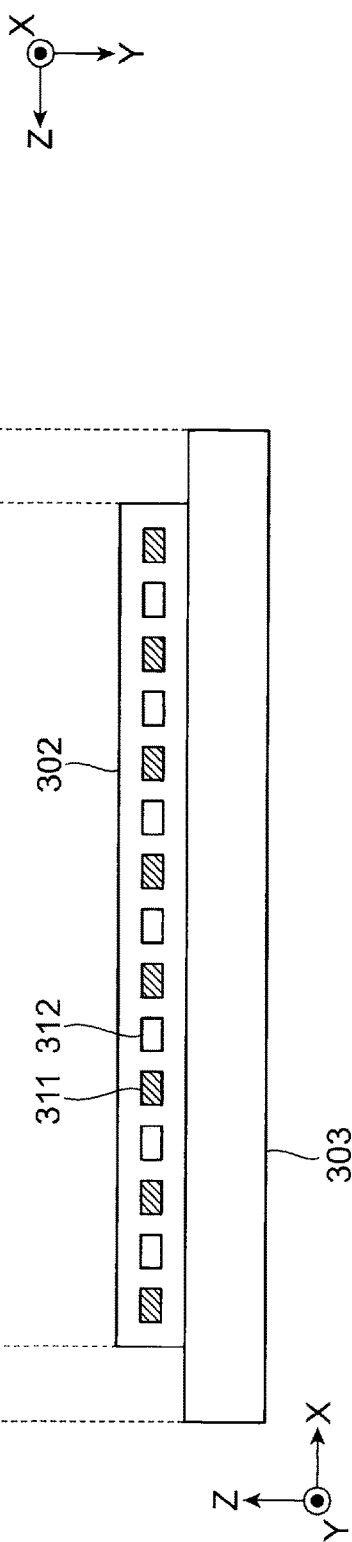

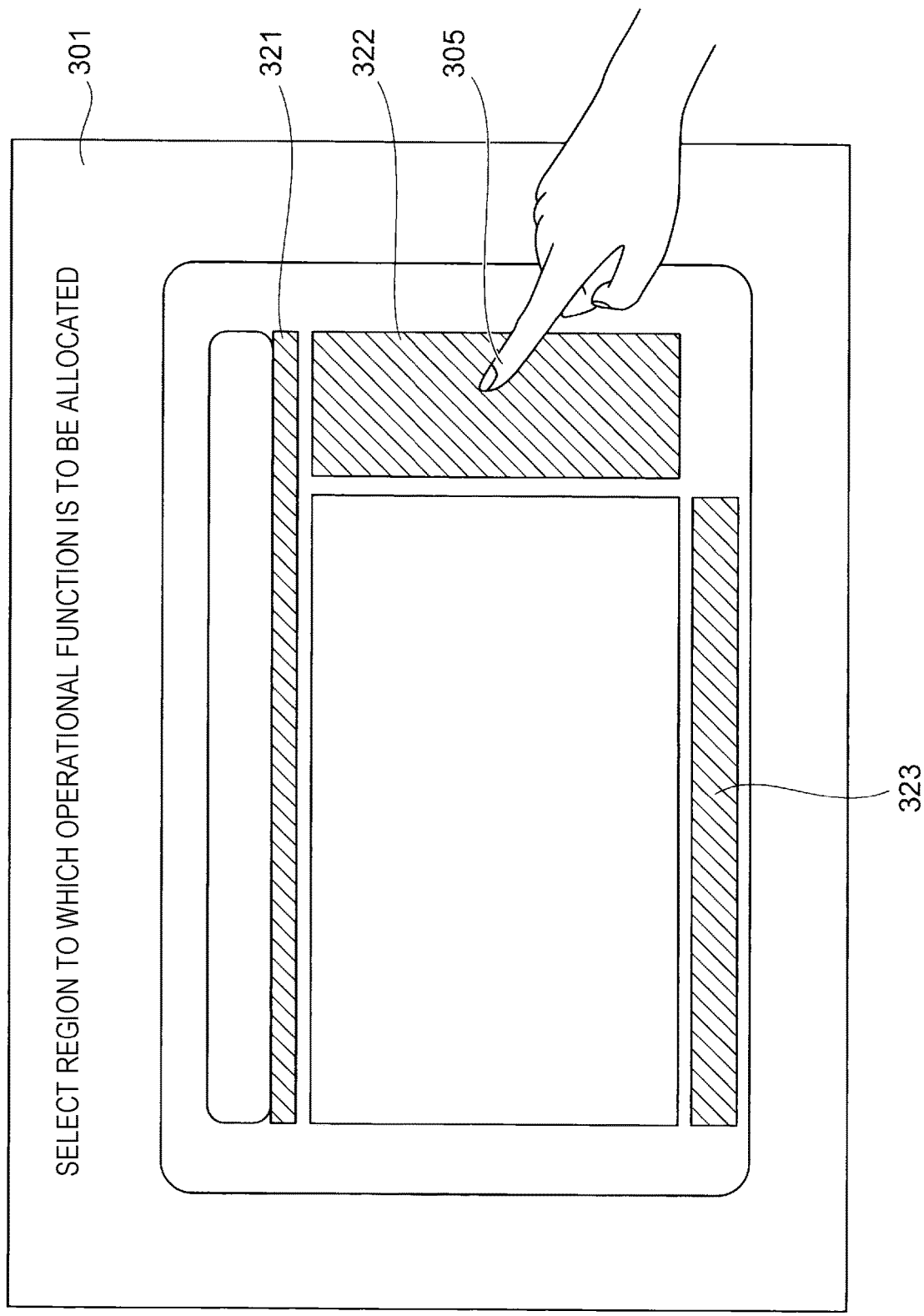

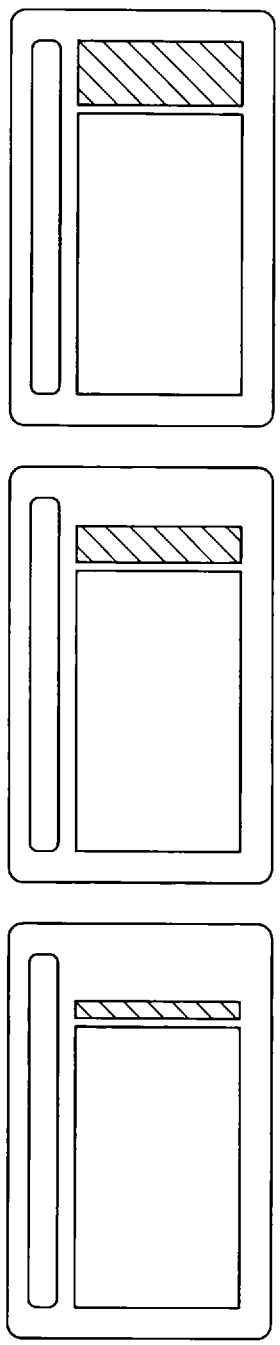

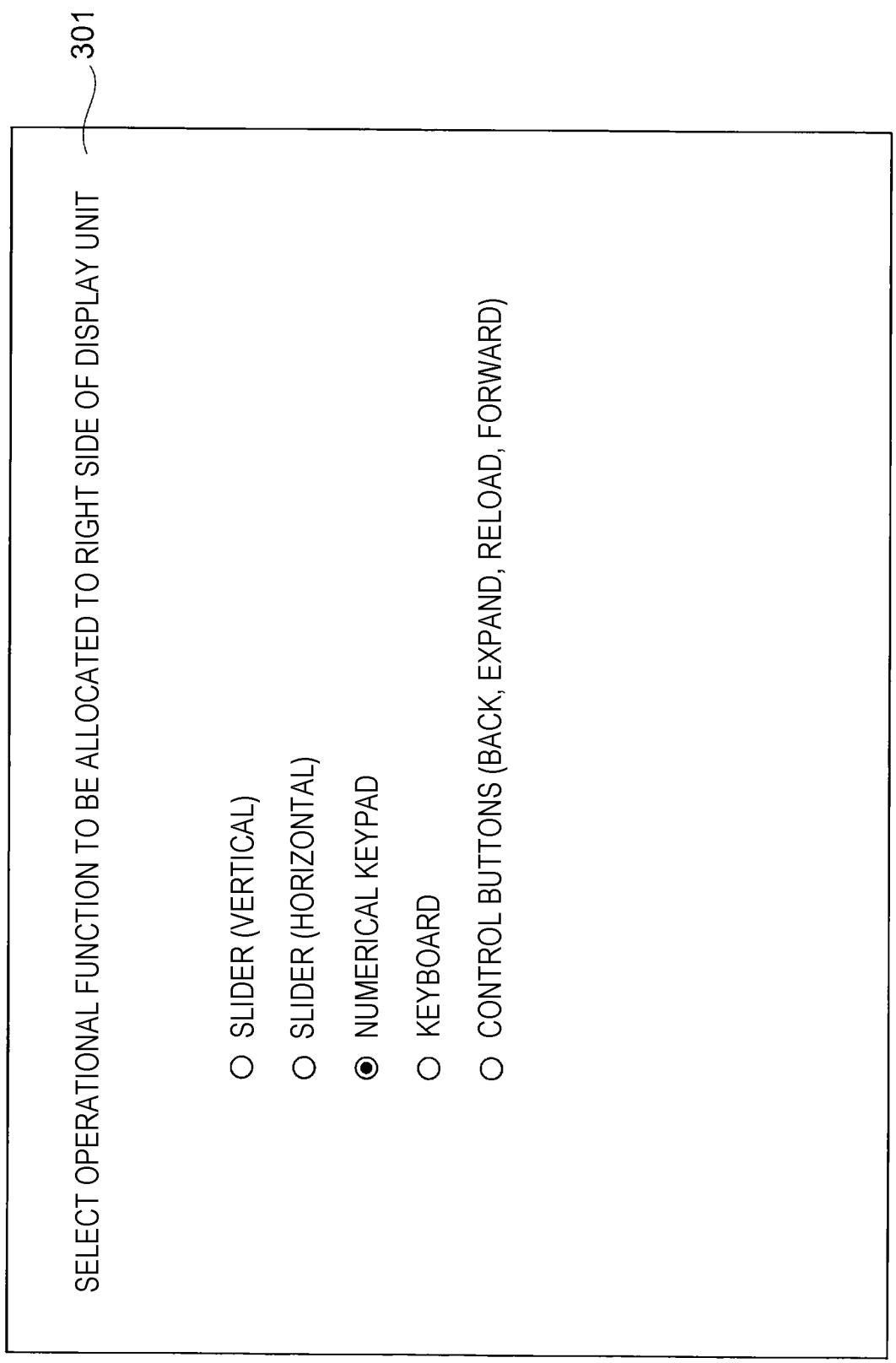

PRINTED NUMERICAL KEYPAD

INPUT DEVICE, IMAGE FORMING APPARATUS, AND NON-TRANSITORY COMPUTER READABLE MEDIUM FOR ALLOCATING A FUNCTION TO A VISUALLY UNASCERTAINABLE DETECTION REGION

CROSS-REFERENCE TO RELATED APPLICATIONS

This application is based on and claims priority under 35 USC 119 from Japanese Patent Application No. 2017-074374 filed Apr. 4, 2017.

BACKGROUND

Technical Field

The present invention relates to input devices, image forming apparatuses, and non-transitory computer readable media.

Summary

According to an aspect of the invention, there is provided an input device including a display on which a work screen is displayed, a detector that optically detects an operation input, and an allocating unit that variably allocates a second operational function to a detection region of the detector. The second operation function is different from a first operational function an allocation position of which is visually ascertainable.

BRIEF DESCRIPTION OF THE DRAWINGS

Exemplary embodiments of the present invention will be described in detail based on the following figures, wherein:

FIG. 4A is a top view of a user interface, FIG. 4B is a side view of the user interface, and FIG. 4C is a front view of the user interface;

FIG. 13 illustrates an example of an operational-function allocation-position reception screen provided by the operation support unit;

FIG. 14 illustrates an example of an operational-function allocation-range size reception screen provided by the operation support unit;

FIG. 15 illustrates an example of an operational-function reception screen provided by the operation support unit;

DETAILED DESCRIPTION

Exemplary embodiments will be described in detail below with reference to the appended drawings.

First Exemplary Embodiment

An image forming apparatus will be described as an example. The image forming apparatus described in this exemplary embodiment forms an image onto a recording medium (sometimes representatively referred to as a "sheet" hereinafter) and has a copying function, a scanning function, a facsimile transmitting-receiving function, and a printing function. Instead of being equipped with all of these functions, the image forming apparatus may be specialized for any one of the above functions and may be, for example, a copier, a scanner, a facsimile transmitter-receiver, or a printer (including a three-dimensional printer).

The image forming apparatus is an example of an input apparatus, and in this exemplary embodiment, an input apparatus equipped with a mechanism that forms an image onto a recording medium is referred to as an "image forming apparatus".

Overall Configuration of Image Forming Apparatus

Figure 1:
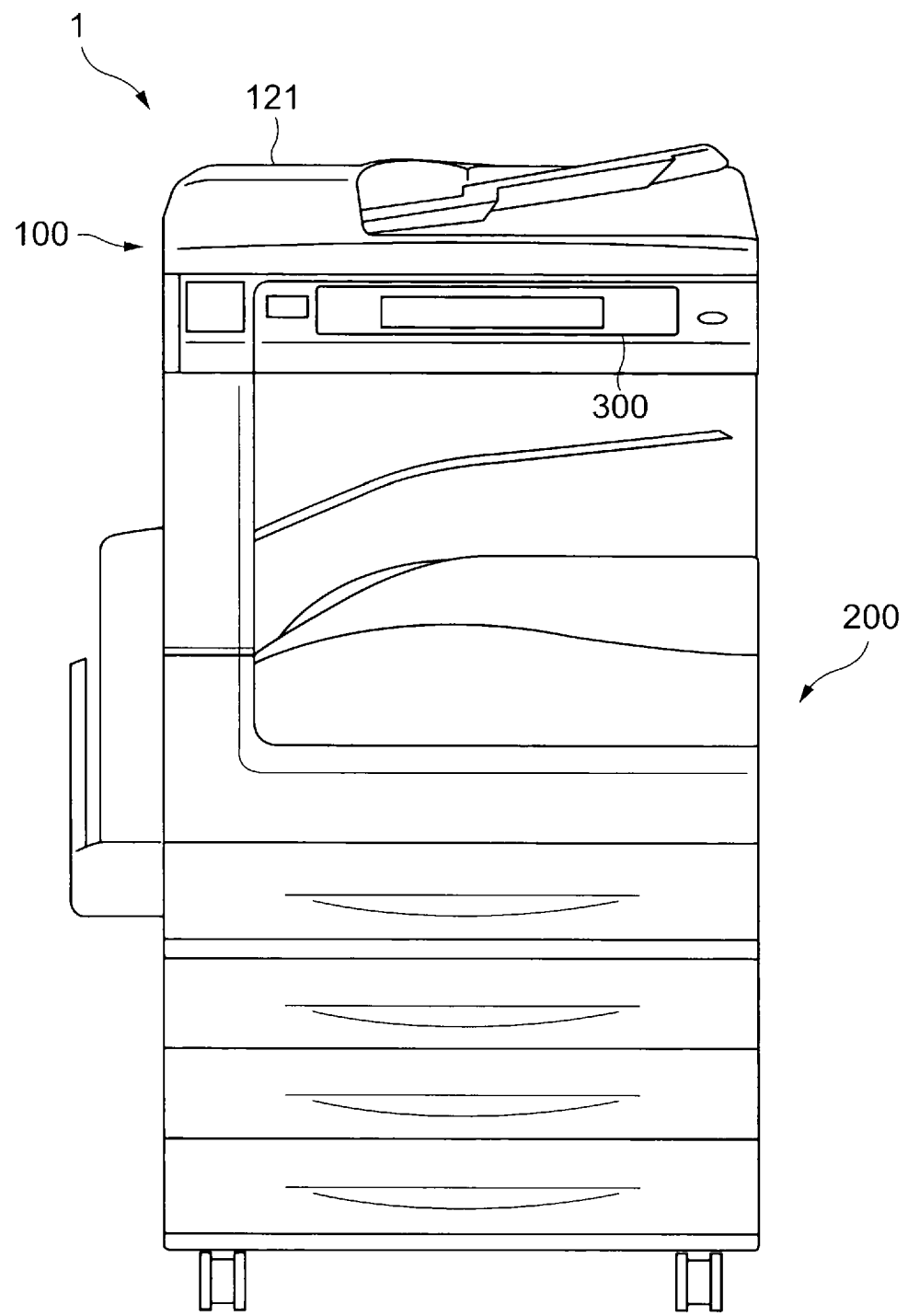
FIG. 1 is an external view of an image forming apparatus according to a first exemplary embodiment.
Figure 2:
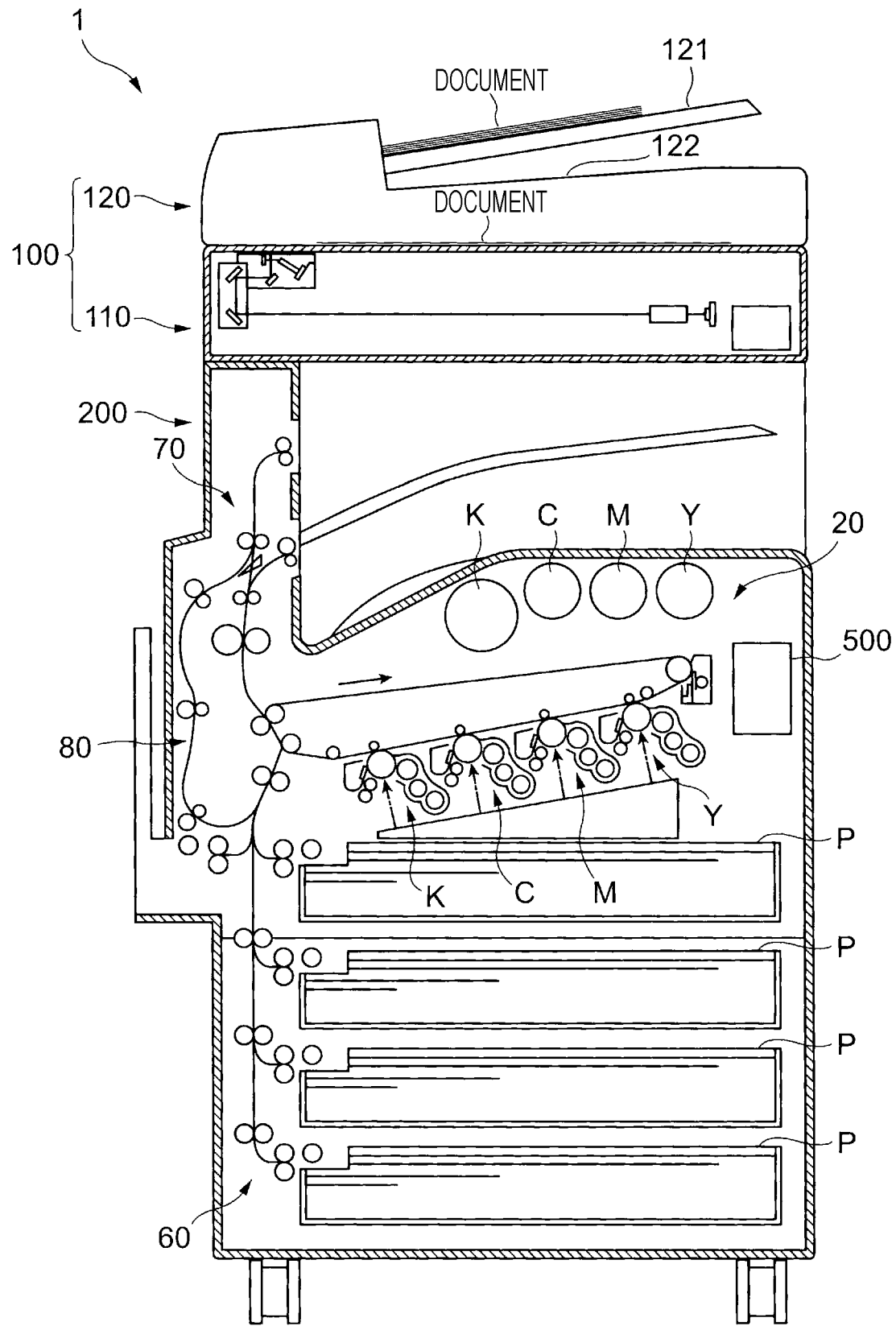
FIG. 2 illustrates the internal structure of the image forming apparatus according to the first exemplary embodiment.

FIG. 1 is an external view of an image forming apparatus 1 according to a first exemplary embodiment. FIG. 2 illustrates the internal structure of the image forming apparatus 1.

The image forming apparatus 1 includes an image reading device 100 that reads an image of a document and an image recording device 200 that records the image onto a recording medium. The image forming apparatus 1 also includes a user interface (UI) 300 that receives an operation input from a user and that displays various types of information to the user. Furthermore, the image forming apparatus 1 includes a control device 500 that controls the overall operation of the image forming apparatus 1. The control device 500 is an example of a detector.

The image reading device 100 is disposed at an upper part of the image forming apparatus 1. The image recording device 200 is disposed below the image reading device 100 and contains the control device 500. The user interface 300 is disposed at the front of the upper part of the image forming apparatus 1, that is, in front of an image reading unit 110, which will be described later, of the image reading device 100.

First, the image reading device 100 will be described.

The image reading device 100 includes the image reading unit 110 that reads a document image and a document transport unit 120 that transports a document to the image reading unit 110. The document transport unit 120 is disposed at an upper part of the image reading device 100, and the image reading unit 110 is disposed at a lower part of the image reading device 100.

The document transport unit 120 has a document accommodation section 121 that accommodates a document and a document output section 122 to which the document transported from the document accommodation section 121 is output. The document transport unit 120 transports the document from the document accommodation section 121 to the document output section 122. The document transport unit 120 is also called an auto document feeder (ADF).

Next, the image recording device 200 will be described.

The image recording device 200 includes an image forming unit 20 that forms an image onto a sheet P, a sheet feeding unit 60 that feeds the sheet P to the image forming unit 20, a sheet output unit 70 that outputs the sheet P having the image formed thereon by the image forming unit 20, and an inversion transport unit 80 that turns over the sheet P having the image formed on one face thereof by the image forming unit 20 and transports the sheet P again toward the image forming unit 20.

The user interface 300 is an example of an input unit (i.e., an input device) used by a user for inputting an operation to the image forming apparatus 1 and includes a display unit and an operation reception unit, which will be described in detail later. The display unit displays a screen for providing various types of information as well as software buttons associated with individual functions. The operation reception unit provides functions, such as detection of an operation performed on a hardware button or detection of an operation performed on a software button.

In this exemplary embodiment, an optical coordinate input device is employed as an operation detector. The optical coordinate input device is an example of a detector. With regard to the optical coordinate input device, a spatial region other than the display unit may also be used as a detection region so long as optical detection is possible. For example, an operation performed on a symbol printed on the surface of a housing may be detected equally to a software button displayed on the display unit.

Basic Operation of Image Forming Apparatus

The image forming apparatus 1 operates as follows.

For example, the image forming apparatus 1 is capable of copying a document. Specifically, the image forming apparatus 1 transmits image data of a document read by the image reading device 100 to the image recording device 200 and forms a document image onto a sheet P.

Furthermore, the image forming apparatus 1 receives a print job from a personal computer (PC) (not shown) connected to a communication line and forms a received image onto a sheet P. Specifically, the image forming apparatus 1 transmits image data contained in the print job received via the communication line to the image recording device 200 and forms the image onto the sheet P.

The image forming apparatus 1 is also capable of performing facsimile transmission and reception. Specifically, the image forming apparatus 1 is capable of transmitting image data of a document read by the image reading device 100 via the communication line.

Moreover, the image forming apparatus 1 is capable of storing image data of a document. Specifically, the image forming apparatus 1 is capable of storing image data of a document into the apparatus or into the PC connected via the communication line.

Configuration of Control Device

Figure 3:
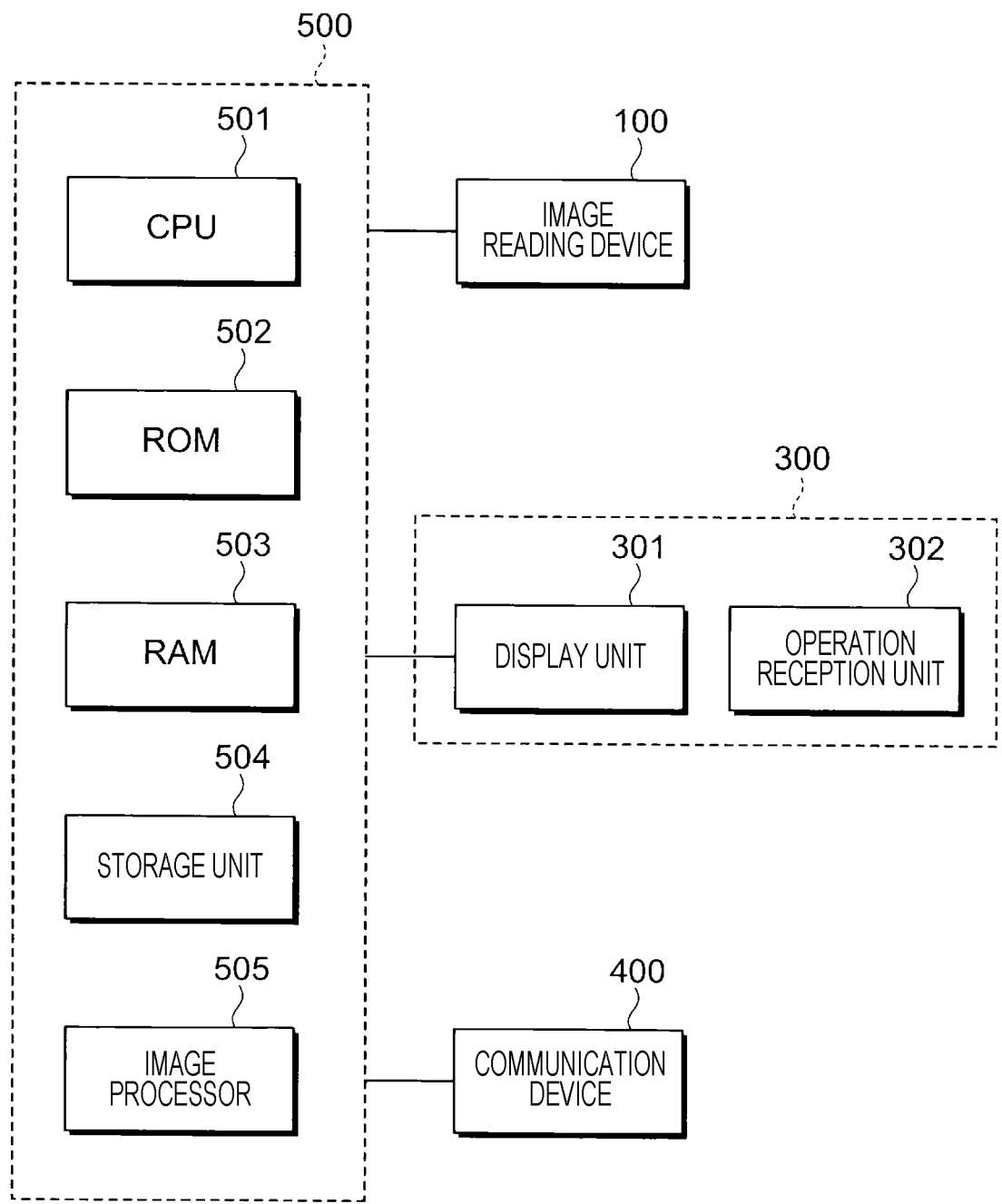
FIG. 3 illustrates a functional block example of a control device and other devices constituting the image forming apparatus.

FIG. 3 illustrates a functional block example of the control device 500 and other devices constituting the image forming apparatus 1.

The control device 500 includes a controller (including a central processing unit (CPU) 501, a read-only memory (ROM) 502, and a random access memory (RAM) 503) that controls the entire apparatus, a storage unit 504 used for storing, for example, image data, and an image processor 505 that performs image processing, such as color correction and gray level correction, on an image expressed by the image data. The control device 500 is an example of an information processing device.

The CPU 501 uses the RAM 503 as a work area and executes a program loaded from the ROM 502.

The storage unit 504 is constituted of, for example, a hard disk device or a semiconductor memory device and stores an image of a document read by the image reading device 100 and image-related data received via a communication device 400. The storage unit 504 is also used for storing a program, where appropriate.

The image processor 505 functions as, for example, a dedicated processor or processing board and executes image processing, such as color correction and gray level correction.

The user interface 300 includes a display unit 301 used for displaying, for example, an operation screen and an operation reception unit 302 that receives an operation input by the user. The operation reception unit 302 is an example of a detector.

The display unit 301 is constituted of a liquid-crystal display panel or an electroluminescence (EL) display panel.

The operation reception unit 302 functions as a detector that detects the position and movement of an input object as an operation input by the user. In this exemplary embodiment, the operation reception unit 302 used is a noncontact coordinate input device. A noncontact coordinate input device detects the coordinate position of an input object moving across an optical detection plane (i.e., a detection region) so as to detect an operation input to a hardware button or a software button.

The term "operation input" in this case refers to an input for making a certain command and may be, for example, pressing of a hardware button, scrolling of a screen, and selection of an icon. The term "input object" refers to an object used when making a certain command to the input device and may be, for example, a finger or a pen.

The term "detection region" refers to a range in which the coordinate input device may detect the coordinates (i.e., input coordinates) of the input object.

The noncontact coordinate input device has a light emitting element (light source) that emits infrared light forming an optical detection plane (i.e., detection region), and also has a sensor unit that detects the position of the input object moving across the detection plane.

The sensor unit may be of a type that uses an imaging camera or a type that uses a light receiving element. For example, in the case of the type that uses an imaging camera, imaging cameras are disposed at opposite ends of one of the edges constituting the detection plane. In the case of the type that uses a light receiving element, such as a photodiode (PD), the light receiving element may be disposed at a position facing a light emitting element, such as a light emitting diode (LED), or light receiving elements and light emitting elements may be alternately arranged in a single line.

For example, the noncontact coordinate input device is disposed along an outer edge of the display unit 301. However, since the display unit 301 may be included in the detection region of the noncontact coordinate input device, the noncontact coordinate input device does not necessarily have to be disposed along an outer edge of the display unit 301. For example, the noncontact coordinate input device may be disposed alongside the display unit 301.

The edge length of the noncontact coordinate input device is set in accordance with the size of the detection region. In this exemplary embodiment, the edge length of the noncontact coordinate input device is set to be larger than the edge length of the display unit 301 at the side at which the noncontact coordinate input device is disposed.

The communication device 400 is constituted of, for example, a modem or a local area network (LAN) interface and is used for facsimile communication or communication with an external device.

External Configuration of User Interface

Next, the user interface 300 used in this exemplary embodiment will be described.

FIG. 4A is a top view of the user interface 300, FIG. 4B is a side view of the user interface 300, and FIG. 4C is a front view of the user interface 300. The upper surface of a device body 303 serving as a housing surface of the image reading device 100 is provided with the display unit 301 that displays a display image and the operation reception unit 302 that optically detects an operated position of the input object.

The operation reception unit 302 according to this exemplary embodiment is constituted of a noncontact coordinate input device, such as a coordinate sensor.

In this exemplary embodiment, the operation reception unit 302 is disposed along one of four edges that define the display unit 301. The length of the operation reception unit 302 according to this exemplary embodiment is set to be larger than the edge length of the display unit 301 at the side at which the operation reception unit 302 is installed. However, the length of the operation reception unit 302 does not necessarily have to be larger than the edge length of the display unit 301. Therefore, the length of the operation reception unit 302 may be substantially equal to the edge length of the display unit 301.

In the case of FIG. 4A, the length of the operation reception unit 302 in an X-axis direction is set to be larger than the length of the display unit 301 in the X-axis direction. Therefore, with regard to the operation reception unit 302 according to this exemplary embodiment, the detection region includes not only the space above the display unit 301 but also the space where the display unit 301 does not exist (i.e., the space to the right of the display unit 301 in the case of FIG. 4A). The detection region will be described in detail later.

The operation reception unit 302 is securely attached to the device body 303 such that the operation reception unit 302 protrudes from the upper surface of the device body 303.

On the side surface of the operation reception unit 302 at the side where the display unit 301 is provided, light emitting elements 311 that emit light and light receiving elements 312 that receive light are alternately arranged. The light emitting elements 311 and the light receiving elements 312 form a detection plane (i.e., a detection region 320 in FIGS. 6A and 6B), which is parallel to the upper surface, above the device body 303. The detection plane is an example of a detection region.

In this exemplary embodiment, the light emitting elements 311 are constituted of, for example, light emitting diodes (LEDs) that emit infrared light. The light receiving elements 312 are constituted of, for example, photodiodes (PDs) that receive reflection light reflected from the input object (e.g., a finger or a pen) moving across the detection plane.

As shown in FIG. 4C, the light emitting elements 311 and the light receiving elements 312 are alternately arranged in a straight line. The sizes and positions of the light emitting elements 311 and the light receiving elements 312 in FIG. 4C are enlarged for illustrative purposes. In actuality, the light emitting elements 311 and the light receiving elements 312 are arranged with sizes and densities according to the desired detection accuracy.

The operation reception unit 302 according to this exemplary embodiment is capable of detecting not only an operation input to a software button displayed on the display unit 301 but also an operation input to an icon printed on the upper surface of the device body 303 as well as an operation input to a hardware button physically disposed in the device body 303.

Figure 5:
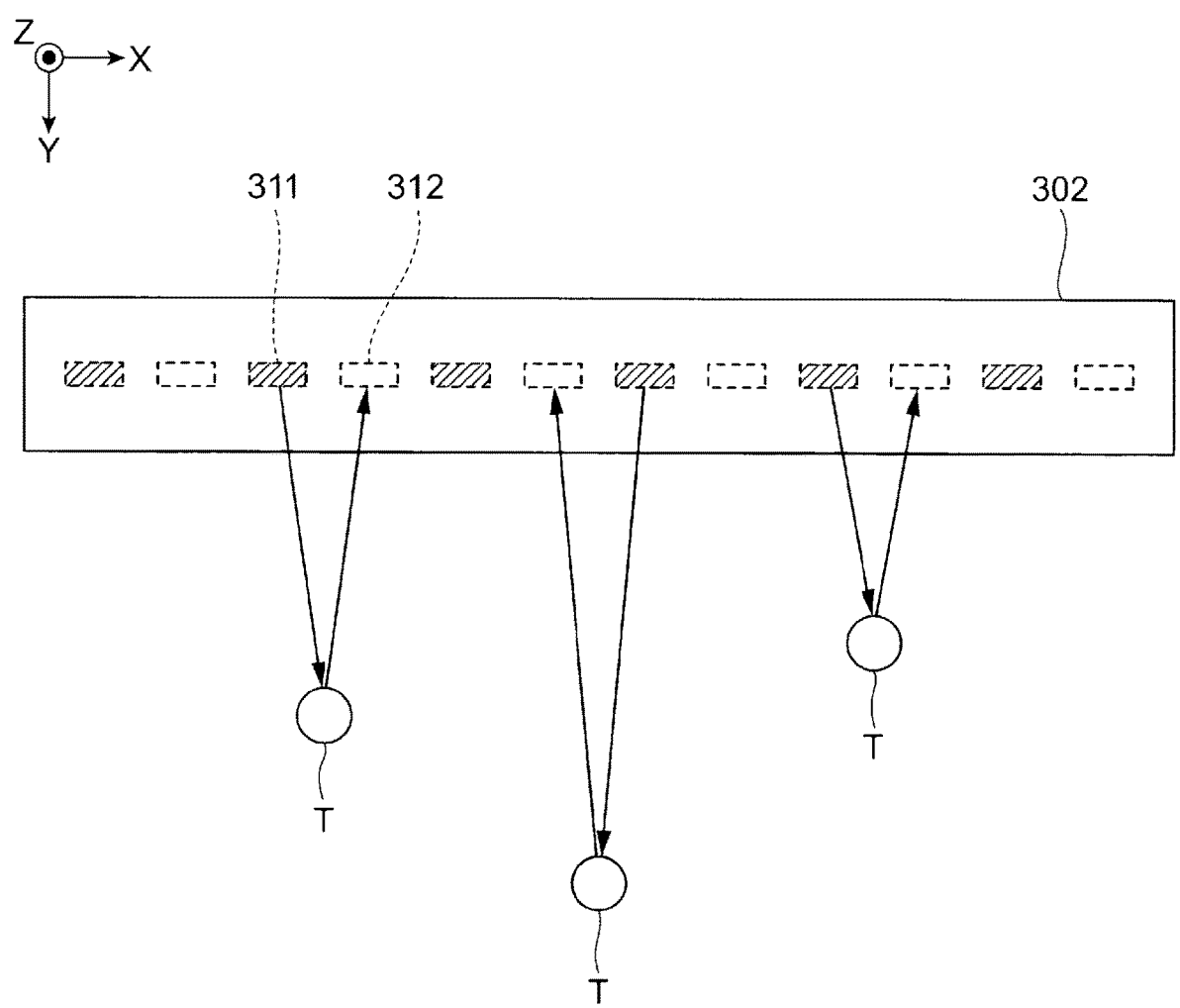
FIG. 5 illustrates the principle of how an operation reception unit detects an input object.

FIG. 5 illustrates the principle of how the operation reception unit 302 detects an input object T.

The operation reception unit 302 used in this exemplary embodiment determines the position of the input object T in the array direction (i.e., the X-axis direction) of the light emitting elements 311 and the light receiving elements 312 by determining which one of the light receiving elements 312 has detected the reflection light of the input object T.

Moreover, the operation reception unit 302 determines the position of the input object T in the direction extending away from the operation reception unit 302 (i.e., a Y-axis direction) in accordance with the intensity of the light received by the light receiving element 312.

The operation reception unit 302 determines the distance between the operation reception unit 302 and the input object T by utilizing the characteristics in which the intensity of the light received by the light receiving element 312 increases with decreasing distance from the input object T to the operation reception unit 302 and the intensity of the light received by the light receiving element 312 decreases with increasing distance from the input object T to the operation reception unit 302.

The operation reception unit 302 is capable of detecting multiple input objects T at one time. Therefore, the operation reception unit 302 is capable of performing so-called multi-touch detection.

Figure 6:
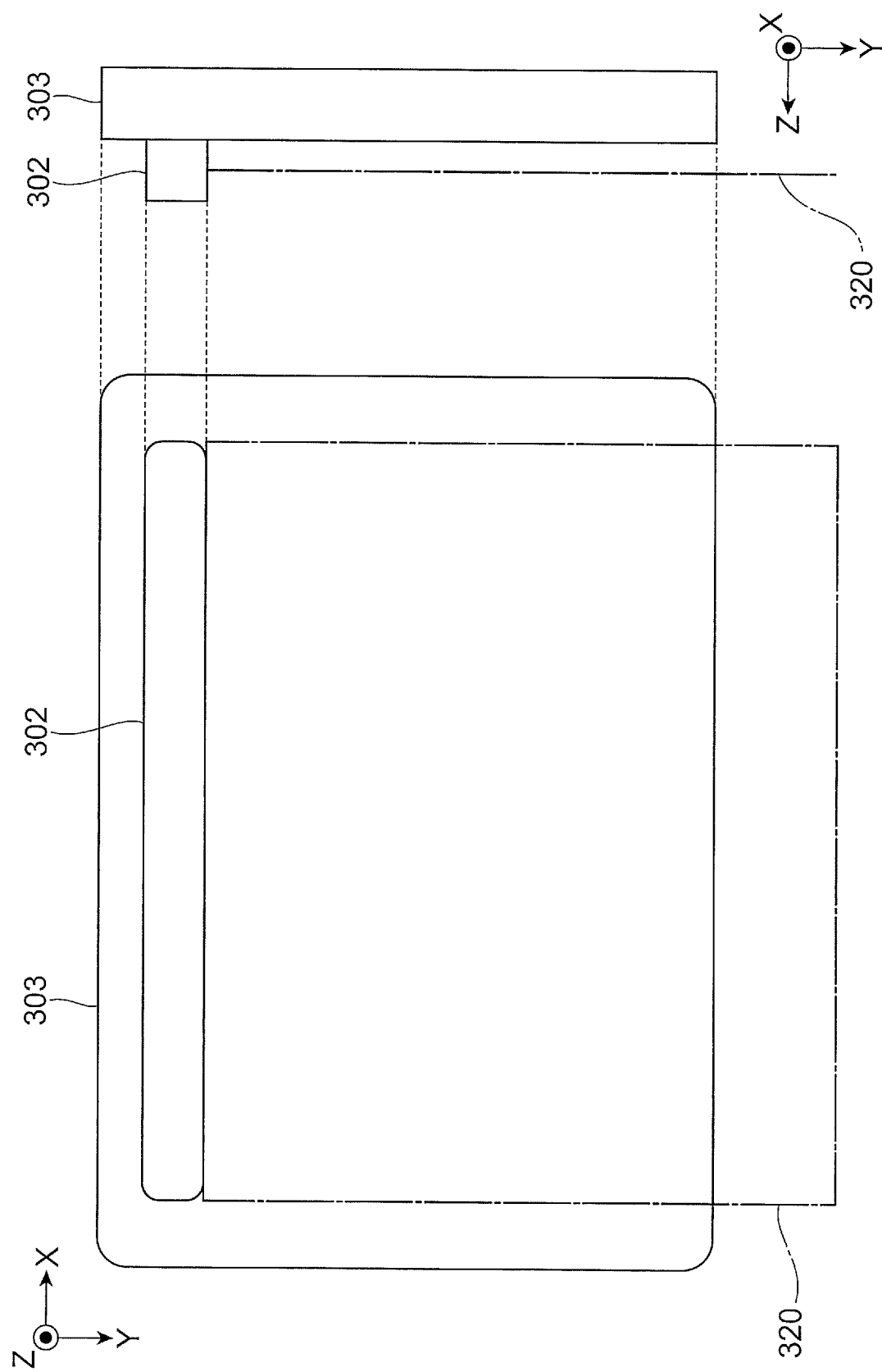
FIG. 6A is a top view illustrating a setting example of a detection region.
FIG. 6B is a side view illustrating the setting example of the detection region.

FIG. 6A is a top view illustrating a setting example of the detection region 320, and FIG. 6B is a side view illustrating the setting example of the detection region 320.

As shown in FIGS. 6A and 6B, the detection region 320 of the operation reception unit 302 extends along the top surface of the device body 303 (including the display unit 301) in the direction away from the operation reception unit 302 (i.e., the Y-axis direction) at a midair position located away from the top surface by a predetermined distance.

The range of the detection region 320 in which the input object T is detectable is determined in accordance with, for example, the emission brightness of the light emitting elements 311 and the light sensitivity of the light receiving elements 312, and is set so as to at least include the space above the display unit 301 (see FIG. 4A). In addition to the space above the display unit 301 (see FIG. 4A), the detection region 320 shown in FIG. 6A includes the space above the device body 303 and the surrounding space located outside the device body 303.

However, because the outer edges of the usable range as the detection region 320 are affected by the usage environment, the outer edges are not necessarily clear.

Operation-Input Detection Functioning Unit

Next, an operation-input detection functioning unit realized by the user interface 300 and the control device 500 (i.e., the CPU 501) operating in cooperation with each other will be described. The operation-input detection functioning unit is an example of a function provided by the input device and realized by the user interface 300 and the control device 500 (i.e., the CPU 501) operating in cooperation with each other. Alternatively, the operation-input detection functioning unit may be realized as an independent function of the user interface 300.

In this exemplary embodiment, the control device 500 functioning as an input device receives, from the operation reception unit 302, information related to the position and movement of the input object in the detection region (e.g., an output row of detection coordinates) and detects the contents of an operation input by the user based on the positional relationship with individual detection ranges allocated to operators (i.e., a software button, an icon, a control bar, and a menu bar) to be operated by the user.

The operators are objects to be operated by the user. By operating any one of these operators, a certain operation is inputtable.

A detection range is a small region used for linking a detected operation input with each operator and serves as a partial region of the detection region.

Normally, the detection ranges are exclusively disposed within a single detection region. Alternatively, the detection ranges may be disposed in an overlapping manner within a single detection region, and the control device 500 may determine whether a detected operation input is associated with any of multiple operators in the overlapping detection ranges.

In this exemplary embodiment, an operator includes a case where the existence thereof is visually ascertainable by the user and a case where the existence thereof is not visually ascertainable. In this exemplary embodiment, the former will be referred to as a "visible button", whereas the latter will be referred to as an "invisible button".

An operator (visible button) whose existence is visually ascertainable includes a hardware button (e.g., a button or a switch) physically disposed on the housing surface of the device body 303, a print button (e.g., an icon, a mark, or a character) printed on the housing surface of the device body 303, and a software button (e.g., a symbol or a picture) displayed on the display screen. The print button printed on the housing surface of the device body 303 is also an example of a hardware button in that the relationship between its allocated function and its physical position is fixed. An operational function linked with a visible button is an example of a first operational function.

An operator (invisible button) whose existence is not visually ascertainable may be allocated to any position so long as the operator is within the detection region. Normally, the operator is allocated to a hardware button physically disposed on the housing surface of the device body 303 or to a region excluding the display unit 301 within the detection region.

Because the existence of an invisible button is not visually ascertainable, an invisible button may be allocated independently of a visible button. Therefore, an invisible button may be allocated to the same position as a visible button within the detection region. An operational function linked with an invisible button is an example of a second operational function.

Because a visible button is visually ascertainable, the first operational function in the detection region is fixedly allocated to the position of the visible button. In contrast, because an invisible button is not visually ascertainable, the second operational function may be variably allocated in the detection region.

In this exemplary embodiment, the term "variably" is used in the context that the position and size of an allocated region are not fixed. In other words, the position and size of a region to which the second operational function is allocated may be set independently of a visible button.

Next, the functional configuration of the operation-input detection functioning unit will be described.

Figure 7:
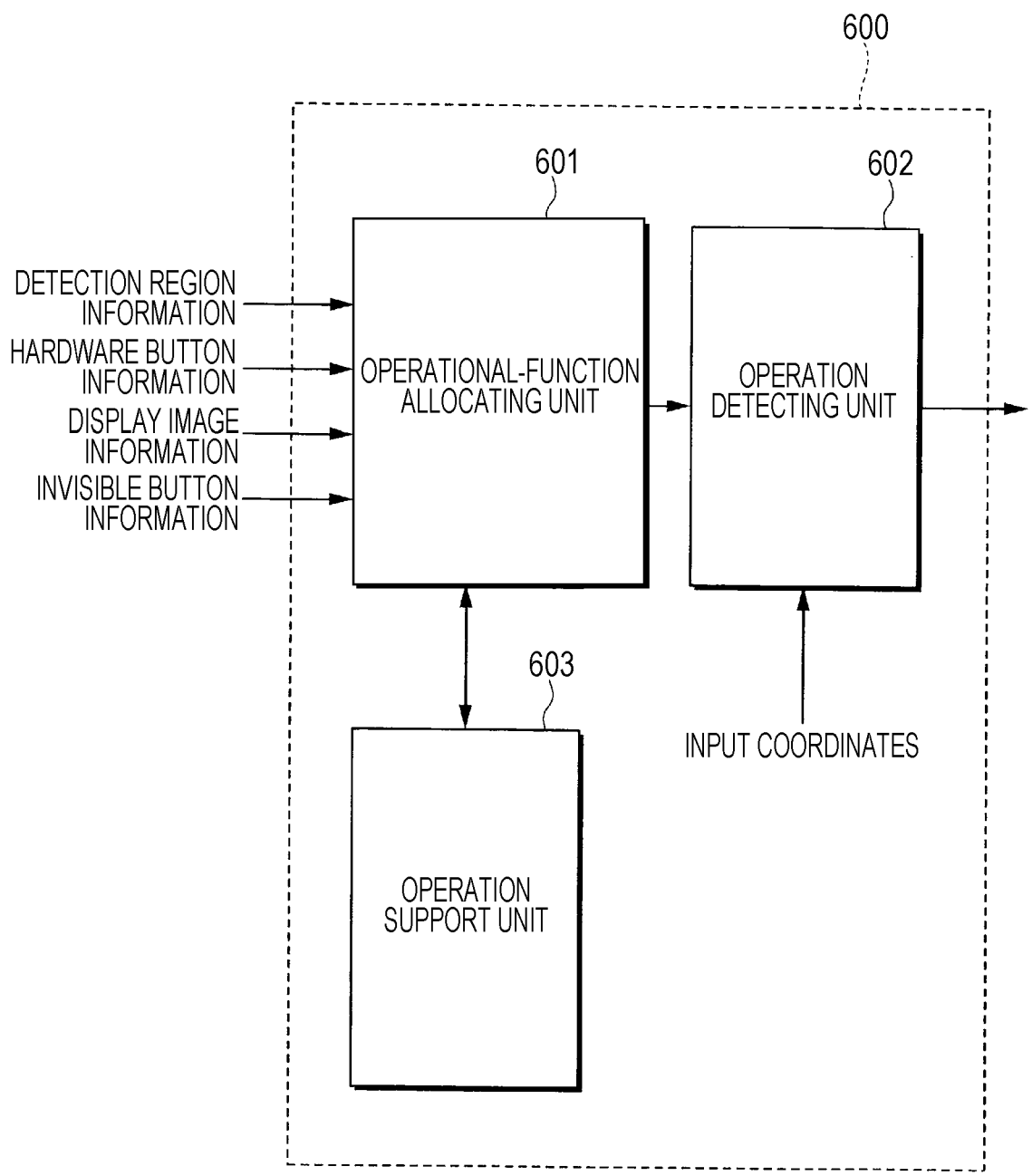
FIG. 7 illustrates the functional configuration of an operation-input detection functioning unit used in this exemplary embodiment.

FIG. 7 illustrates the functional configuration of an operation-input detection functioning unit 600 used in this exemplary embodiment.

The operation-input detection functioning unit 600 has an operational-function allocating unit 601 that allocates an operational function in the detection region, an operation detecting unit 602 that compares a detection range corresponding to the allocated operational function with input coordinates so as to detect the contents of an operation input, and an operation support unit 603 that supports an allocating process of the operational function.

The operational-function allocating unit 601 provides a function of using detection range information, hardware button information, display image information, and invisible button information as input information so as to determine which position within the detection region a usable operational function is to be allocated to at the processing point.

The detection region information is used for providing the outer edge of a range to which the operational function may be allocated.

The hardware button information is positional information (coordinate information) of a hardware button within the detection region or information about the detection range of the hardware button.

The display image information is used for acquiring the contents and the display position of a software button on the display screen.

The invisible button information is used for allocating the second operational function in the detection region and contains information about, for example, the allocation position and the size of an invisible button selected by the user.

The operation detecting unit 602 detects the contents of an operation input by the user by comparing input coordinates received from the operation reception unit 302 with the detection ranges linked with the individual operational functions.

The operation support unit 603 provides functions for supporting an operation related to, for example, an operational function to be used as an invisible button and the allocation position. Specifically, the functions to be provided include a function for notifying the user that an operator (invisible button) whose existence is not visually ascertainable is allocated and a function for allocating an invisible button in the detection region through an operation performed by the user. Specific examples of the functions to be provided by the operation support unit 603 will be described later.

First, a detecting process executed by the operation-input detection functioning unit 600 will be described.

Figure 8:
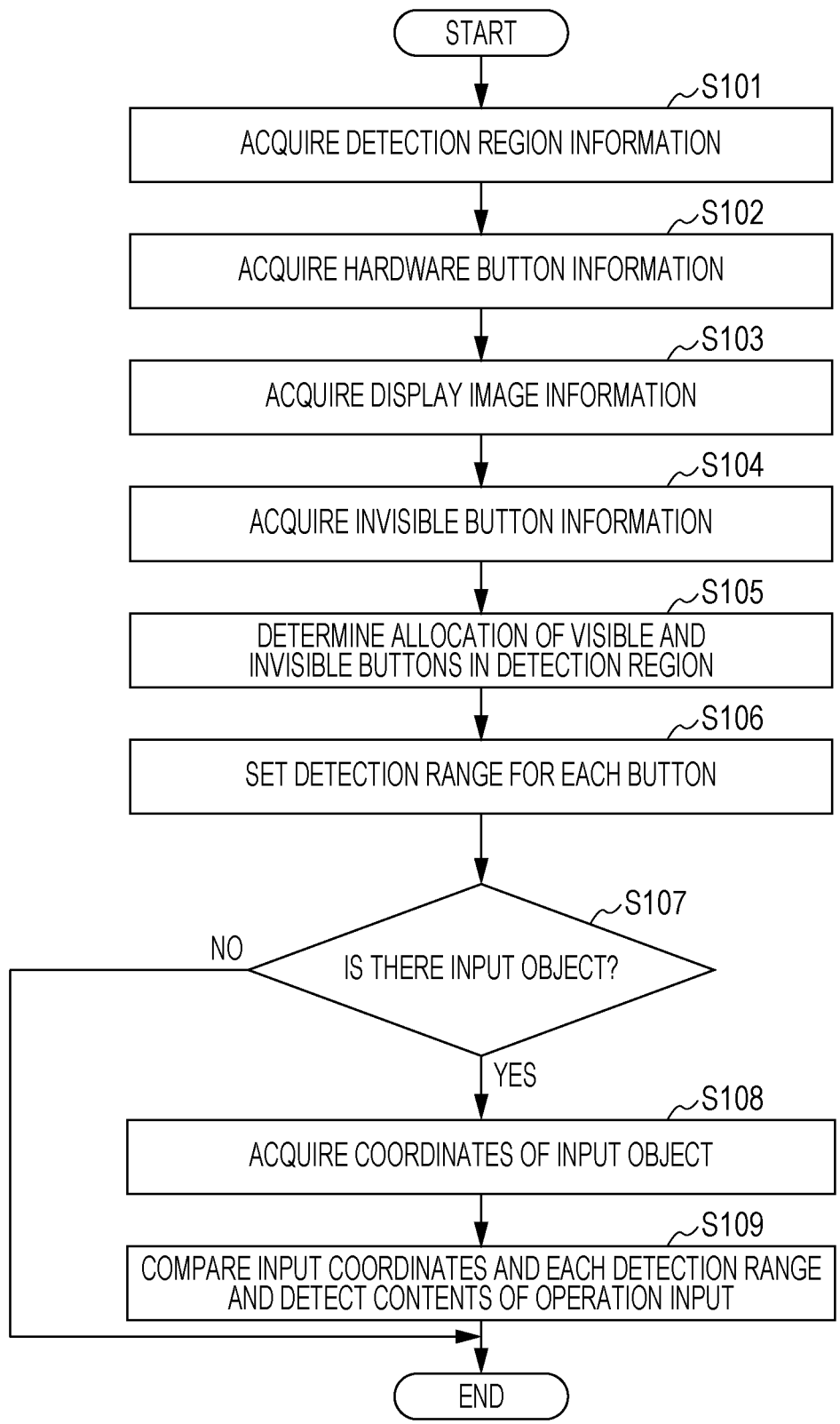
FIG. 8 is a flowchart illustrating an example of a detecting process executed by the operation-input detection functioning unit.

FIG. 8 is a flowchart illustrating an example of the detecting process executed by the operation-input detection functioning unit 600.

The process executed by the operation-input detection functioning unit 600 involves two stages. For example, the first stage is executed every time the display screen changes and involves allocating operators (i.e., visible and invisible buttons) usable at the processing point in the detection region. The first stage is executed by the operational-function allocating unit 601. The second stage is executed every time a new operation input from an input object is detected. The second stage is executed by the operation detecting unit 602.

First, in step S101, the operational-function allocating unit 601 acquires detection region information. For example, information that defines the outer edge of the detection region 320 (see FIG. 6A) is acquired. In this exemplary embodiment, the detection region is also used for detecting a tapping operation, a double tapping operation, a long pressing operation, a dragging operation, a swiping operation, and a flicking operation. With regard to these operations, the operational functions thereof are differentiated in accordance with the detected modes and differ from the second operational functions linked with partial regions of the detection region.

Subsequently, in step S102, the operational-function allocating unit 601 acquires hardware button information. If there is no hardware button disposed on the housing surface, as in the device body 303 shown in FIGS. 4A to 4C, this step for acquiring hardware button information is skipped.

Then, in step S103, the operational-function allocating unit 601 acquires display image information. The display image information contains contents to be provided for user confirmation as well as software button information for providing an operation corresponding to the contents.

In step S104, the operational-function allocating unit 601 acquires invisible button information. If an invisible button is not used, this information is not acquired. The allocation of an invisible button in the detection region 320 includes a case where the allocation is executed as a function of an application and a case where the allocation is executed in response to an operation performed by the user.

When desired information is acquired, the operational-function allocating unit 601 determines the allocation of visible and invisible buttons usable at each processing point in the detection region in step S105.

Subsequently, in step S106, the operational-function allocating unit 601 sets a detection range for each of the visible and invisible buttons.

When the setting process is completed, the operation detecting unit 602 determines in step S107 whether or not there is an input object (e.g., a finger or a pen) based on the existence or nonexistence of input coordinates.

If there are no input coordinates to begin with or if the detected input coordinates have disappeared, the operation detecting unit 602 obtains a negative result and ends the detecting process being executed. When the detecting process ends, a new detecting process commences.

If an input object is detected, the operation detecting unit 602 acquires the coordinates of the input object in step S108. The operation detecting unit 602 acquires multiple coordinate rows (i.e., a movement trajectory) sampled for every input object recognized.

Then, in step S109, the operation detecting unit 602 compares the acquired input coordinates with the detection range set for each operator and detects the contents of the operation input.

If the input coordinates are included in any of the detection ranges and a command, such as a tap, is detected, the operation detecting unit 602 determines that the operation corresponding to the operational function linked with the operator (i.e., visible or invisible button) is effective.

Next, a user notification function applied when an operational function is allocated to or is being allocated to an invisible button independently of an operation performed by the user will be described.

Figure 9:
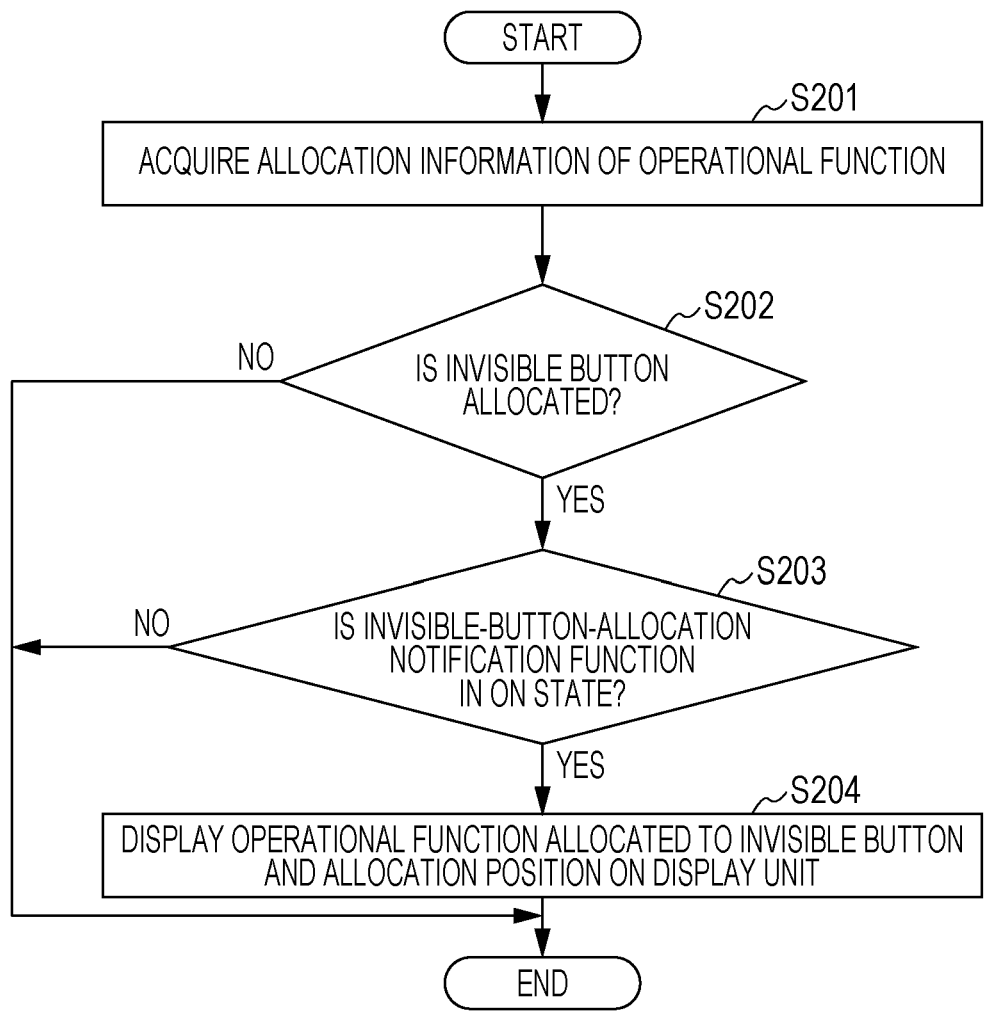
FIG. 9 is a flowchart illustrating an example of an invisible-button-allocation notification function executed by an operation support unit.

FIG. 9 is a flowchart illustrating an example of an invisible-button-allocation notification function executed by the operation support unit 603. The function shown in FIG.

9 is prepared for notifying the user of the allocation of an invisible button whose existence is not visually confirmable.

First, in step S201, the operation support unit 603 acquires operational-function allocation information from the above-described operational-function allocating unit 601. The information in this case contains information about both visible and invisible buttons.

Then, in step S202, the operation support unit 603 determines whether or not the invisible button is allocated in the detection region. If there is no allocation (i.e., in a case of a negative result), the operation support unit 603 ends the process.

If there is allocation of the invisible button (i.e., in a case of a positive result), the operation support unit 603 determines in step S203 whether or not the invisible-button-allocation notification function is in an ON state. If the notification function is in an OFF state (in a case of a negative result), the operation support unit 603 ends the process. For a user who understands the allocation of the invisible button from experience, interruption caused by the allocation notification is avoidable.

If the notification function is in an ON state, the operation support unit 603 displays the operational function allocated to the invisible button and the allocation position on the display unit 301 in step S204. With this display, even if an operational function is allocated to an invisible button independently of an operation performed by the user, the user may recognize a visually-nonexistent invisible button and perform an operation.

Next, a function executed when the user allocates an operational function to an invisible button will be described.

Figure 10:
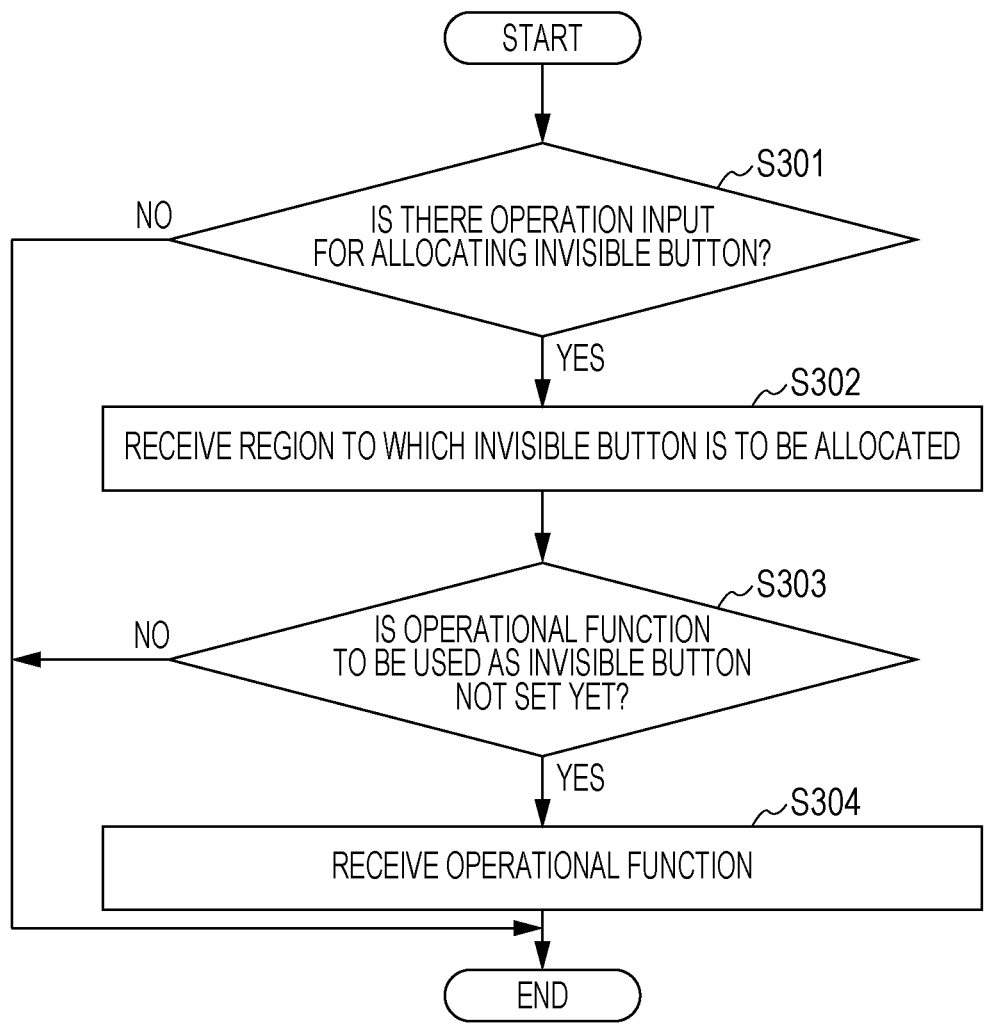
FIG. 10 is a flowchart illustrating an example of a function for supporting an invisible-button allocating process performed by a user.

FIG. 10 is a flowchart illustrating an example of a function for supporting an invisible-button allocating process performed by the user. This function is also executed by the operation support unit 603.

In step S301, the operation support unit 603 repeatedly determines whether or not an operation for allocating an invisible button is input.

If an operation input is not confirmable (i.e., in a case of a negative result), the operation support unit 603 ends the process. If an operation input is confirmed (i.e., in a case of a positive result), the operation support unit 603 executes a process for receiving a region to which the invisible button is to be allocated in step S302. In this process, the allocation position is received via, for example, a work screen to be described later.

Then, in step S303, the operation support unit 603 determines whether the operational function to be used as the invisible button is not set yet.

If it is not necessary to make a selection (i.e., in a case of a negative result), such as when a single operational function to be allocated is identified from the relationship with the display screen or when an allocated processing function is set in advance, the operation support unit 603 ends the process. In contrast, if an operational function is not set yet (i.e., in a case of a positive result), the operation support unit 603 executes a process for receiving an operational function to be allocated to the invisible button via the display unit 301 in step S304. After receiving the operational function, the operation support unit 603 ends the process.

Example of Operation and Example of Display Screen

An example of an operation performed by the user via the operation-input detection functioning unit 600 according to this exemplary embodiment and an example of a display screen will now be described.

Figure 11A:
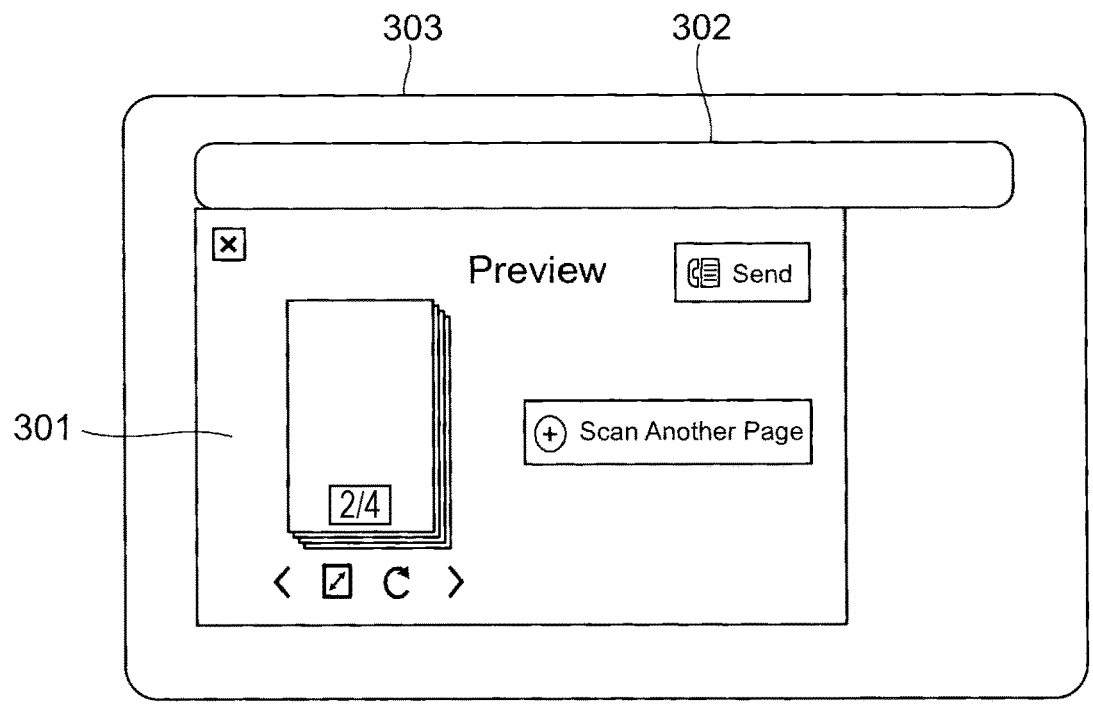
FIGS. 11A and 11B illustrate a change of a display screen caused when control buttons are displayed on a display unit (i.e., when the control buttons are allocated to visible buttons) and when the control buttons are virtually disposed on a housing surface below the display unit (i.e., when the control buttons are allocated to invisible buttons)
Figure 11B:
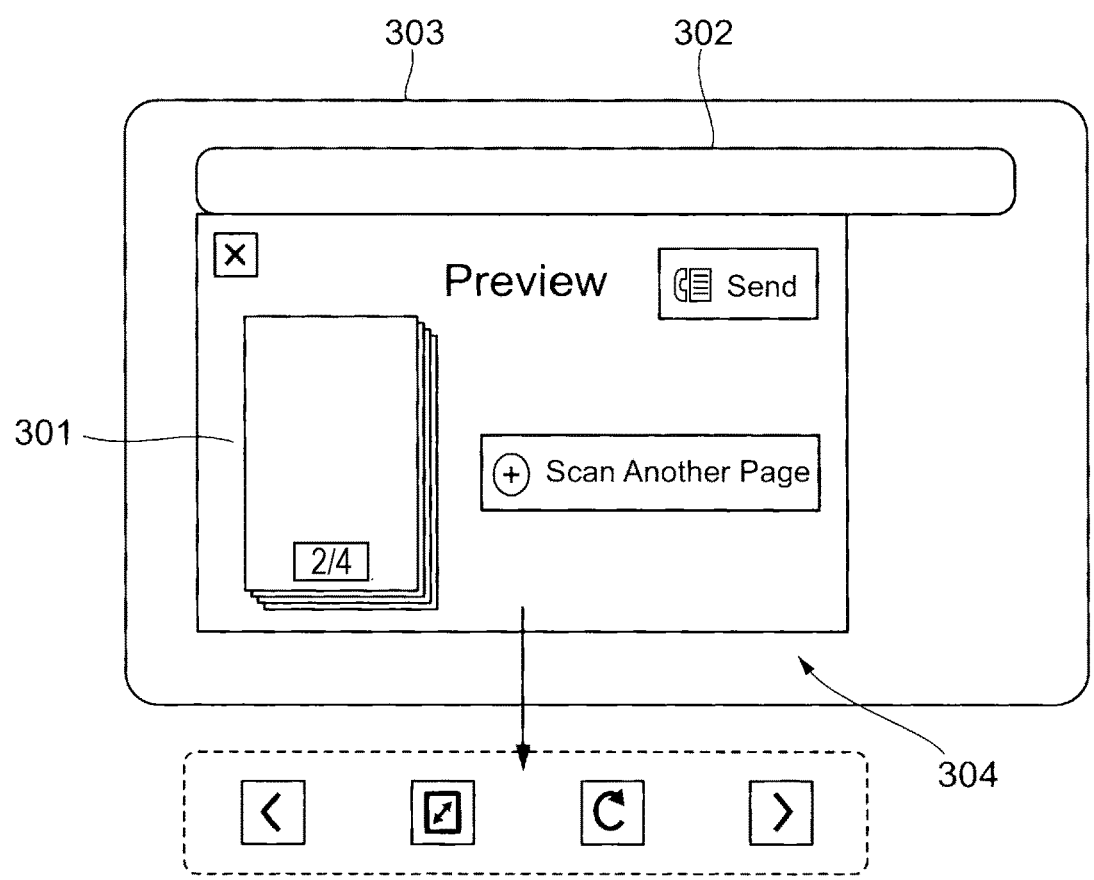

Change of Display Screen Caused by Different Allocation Destination of Control Button FIGS. 11A and 11B illustrate a change of a display screen caused when control buttons are displayed on the display unit 301 (i.e., when the control buttons are allocated to visible buttons) and when the control buttons are virtually disposed on the housing surface below the display unit 301 (i.e., when the control buttons are allocated to invisible buttons).

FIGS. 11A and 11B illustrate a case where four control buttons are allocated to visible buttons and a case where the four control buttons are allocated to invisible buttons, respectively. The four control buttons in this case are "back", "expand", "reload", and "forward" buttons, respectively, in that order from the left side toward the right side of the display unit 301.

FIG. 11A illustrates an example of a display screen in a case where the four control buttons are displayed on the display unit 301. Specifically, in this example, the four control buttons are allocated to visible buttons.

In addition to an image of a page to be confirmed, the same display screen has a send button, a button for loading another page by scanning, and so on. However, the display areas of these buttons are reduced in the vertical direction for the four control buttons displayed along the lower edge of the display screen.

FIG. 11B illustrates an example of a display screen in a case where the four control buttons are allocated to the housing surface of the device body 303 (specifically, a housing surface 304 located outside the lower edge of the display unit 301) in accordance with the function of the operation-input detection functioning unit 600. Specifically, the four control buttons are allocated to invisible buttons.

In this case, since the four control buttons do not have to be displayed on the display screen, the display space is enlarged in the vertical direction, so that the display sizes of, for example, the image of the page to be confirmed, the send button, and so on are increased, as compared with FIG. 11A, thereby achieving improved visibility.

Furthermore, since larger detection ranges may be allocated to the four control buttons, as compared with the case where the control buttons are displayed on the display unit 301, a misoperation caused by erroneous pressing may be reduced. Due to an inability to visually check the allocation positions, it is desirable that the buttons be separated from one another to an extent that erroneous pressing does not occur.

The four control buttons are allocated to the position of the housing surface 304, as indicated by a dashed line outside the frame of the device body 303, and the operation reception unit 302 is capable of optically detecting an operation input to the housing surface 304. Therefore, the user may perform a desired operation while checking the display screen having the improved visibility, as compared with the case where the four control buttons are displayed on the display unit 301. The four control buttons illustrated within the dashed line are for illustrative purposes, and in actuality, detection ranges for detecting an operation input with respect to the respective operational functions are allocated.

The positions to which the control buttons are allocated are examples. In principle, each control button may be allocated to any position so long as the position is within the detection region of the operation reception unit 302. For example, the control buttons may be allocated to a housing surface at the right side of the display unit 301, a space further outward from the device body 303, or a space above the display unit 301.

Invisible-Button-Allocation Notification Screen

As described with reference to FIG. 11B, by allocating some operational functions to the space outside the display space of the display unit 301, the display size of the display image to be displayed on the display unit 301 may be increased, as compared with a case where the operational functions are not allocated to the space outside the display space of the display unit 301. However, since the existence of invisible buttons is not visually confirmable, it may be difficult for a user with no background knowledge to notice the existence of the invisible buttons.

Figure 12A:
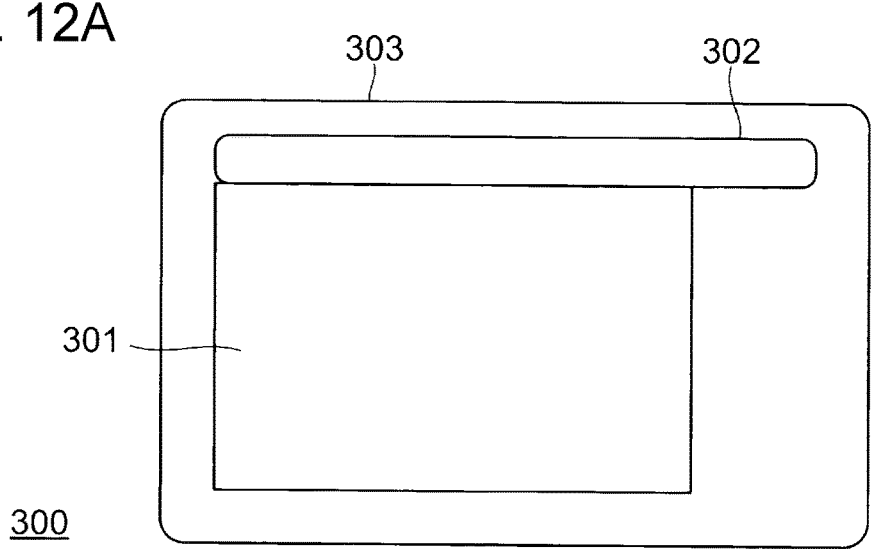
FIGS. 12A to 12C illustrate an example of an invisible-button-allocation notification screen provided by the operation support unit.
Figure 12B:
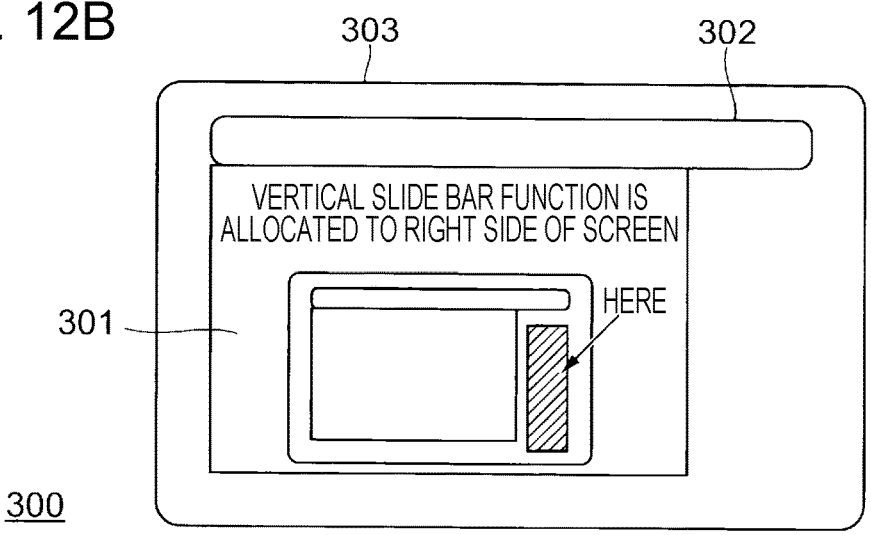
Figure 12C:
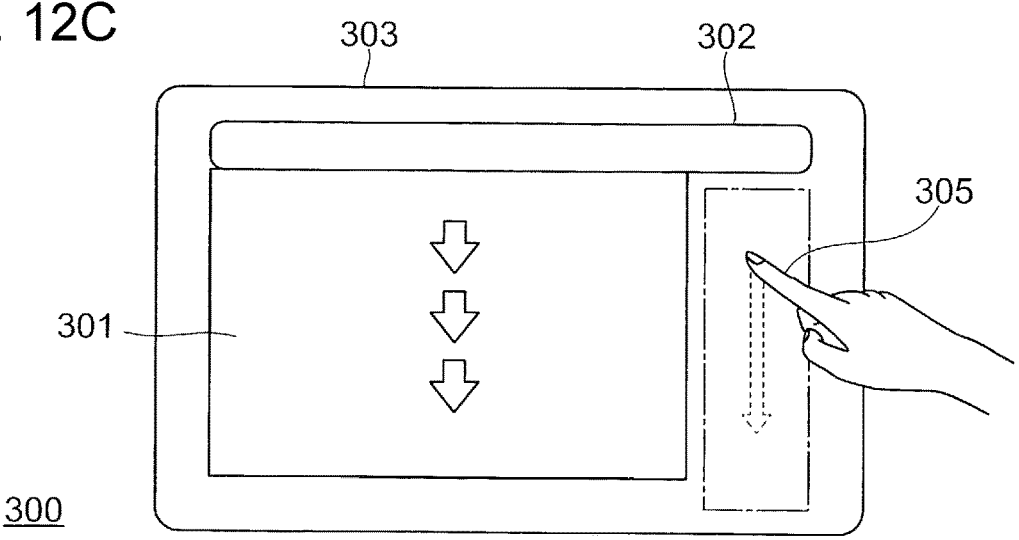

FIGS. 12A to 12C illustrate an example of an invisible-button-allocation notification screen provided by the operation support unit 603.

FIG. 12A illustrates the state of the user interface 300 prior to notification according to this function. Although some operational functions are allocated as invisible buttons in actuality, the user is not able to notice the existence of the invisible buttons by viewing the user interface 300. In particular, it is difficult to notice the allocation of the invisible buttons if a command is not made by the user.

FIG. 12B illustrates a state where the notification screen is displayed on the display unit 301 in accordance with the notification function of the operation support unit 603 described with reference to FIG. 9. In this case, the display unit 301 indicates the contents and the allocation position of an operational function allocated as an invisible button by using both text and a schematic diagram. Specifically, a slider used for scrolling the screen in the vertical direction is allocated to the right side of the screen.

FIG. 12C illustrates an operation input by the user upon completion of the notification. At this stage, the user knows from the previous notification that the slider for scrolling the screen in the vertical direction is allocated to the region at the right side of the display unit 301. Therefore, by sliding an index finger 305 downward along the housing surface of the device body 303, the display screen is scrolled downward.

Invisible-Button Allocation-Position Selection Screen

An example of a screen used by the user for selecting the allocation position of an operational function will now be described.

FIG. 13 illustrates an example of an operational-function allocation-position reception screen provided by the operation support unit 603. In the example in FIG. 13, three regions 321 to 323 are schematically presented as allocation position candidates, and a text message prompting the user to select any one of the regions is indicated.

The region 321 is a narrow region located between the display unit 301 and the operation reception unit 302 and has a length that is substantially equal to the length of the operation reception unit 302. The region 322 is a region on the housing surface of the device body 303 located at the right side of the display unit 301. The region 323 is a region on the housing surface of the device body 303 located at the lower side of the display unit 301. The number of selectable regions is not limited to three.

Accordingly, by providing such a mechanism that allows the user to select a region to which an operational function is to be allocated, the operational function may be allocated as an invisible button to a position readily operable by the user.

Although one region is selected from among the three regions in the example shown in FIG. 13, a screen used for selecting the operational function to be allocated may be prepared after or before this selection.

Furthermore, although one region is selected from among the three regions in the example shown in FIG. 13, the user may be allowed to freely select the position to which the operational function is to be allocated. In this case, it is desirable that the allocable range (i.e., limited by the outer edge of the design detection region) be indicated on the screen by, for example, scrolling.

The timing at which the screen shown in FIG. 13 is displayed is not limited to the timing at which some of the operational functions are allocated to invisible buttons, and may be the timing at which the region to which the invisible buttons are allocated is set in advance.

Invisible-Button Allocation-Range Selection Screen

An example of a screen used by the user for selecting the size of a range to which an operational function is to be allocated will now be described.

FIG. 14 illustrates an example of an operational-function allocation-range size reception screen provided by the operation support unit 603. The reception screen shown in FIG. 14 is capable of selectively receiving one of three sizes. In FIG. 14, a narrow size is selected.

In the case of FIG. 14, the display screen of the display unit 301 schematically shows differences in allocation widths in accordance with the options "narrow", "standard", and "wide".

Accordingly, by providing such a mechanism that allows the user to select a range to which an operational function is to be allocated, a range that is readily operable by the user may be allocated to an invisible button.

Although FIG. 14 illustrates an example where the region to which an operational function is to be allocated is enlarged or reduced in the horizontal direction, the region may be enlarged or reduced in the vertical direction or may be enlarged or reduced in both the horizontal direction and the vertical direction.

Furthermore, although one of options prepared in advance is selected in the case of FIG. 14, a range may be selected in accordance with an operation input by the user.

Operational-Function-Type Selection Screen

An example of a screen used for selecting an operational function to be allocated to a position selected by the user will now be described.

FIG. 15 illustrates an example of an operational-function reception screen provided by the operation support unit 603. The reception screen shown in FIG. 15 is capable of selectively receiving one of five types of operational functions. Specifically, the five types of operational functions are a slider for scrolling the screen in the vertical direction, a slider for scrolling the screen in the horizontal direction, a numerical keypad, a keyboard, and control buttons. In FIG. 15, the numerical keypad is selected.

Accordingly, since the user may select the type of operational function to be allocated as an invisible button, the user may perform an operation input while recognizing the type of allocated operational function even if the user is not able to visually confirm the existence thereof.

Although the arrangement and the positions of the buttons prepared with respect to the selected operational functions are not indicated in the example in FIG. 15, for example, the arrangement may be schematically displayed on the screen. With the arrangement of the buttons being notified in advance, the user may operate the non-displayed buttons without mistakes.

Change of Allocation of Operational Function to Invisible Button

An example of an operation for changing an operational function displayed on the screen of the display unit 301 to an invisible button will now be described.

Figure 16A:
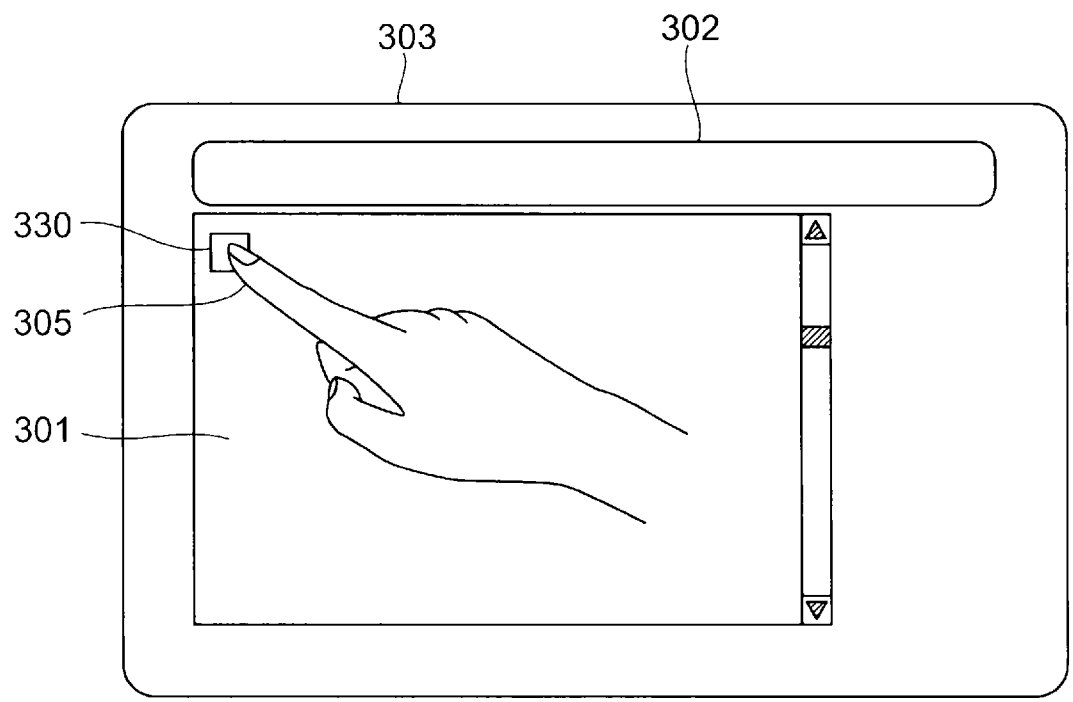
FIGS. 16A and 16B illustrate an example where a button operation is used for making an operational function invisible.
Figure 16B:
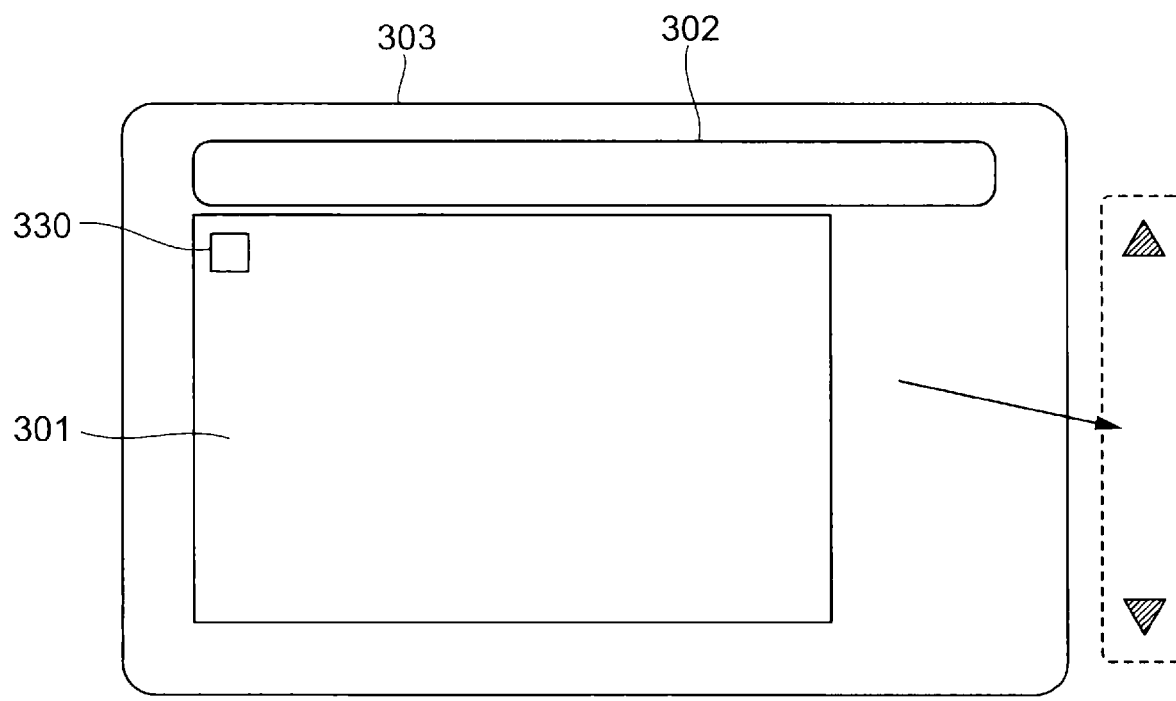

FIGS. 16A and 16B illustrate an example where a button operation is used for making an operational function invisible.

FIG. 16A illustrates a state where a change button 330 displayed on the display screen of the display unit 301 is tapped by the user using the index finger 305. In the display screen in FIG. 16A, a slider for scrolling the display screen in the vertical direction is displayed at the right end of the screen.

FIG. 16B illustrates the user interface 300 after the change button 330 is tapped. As shown in FIG. 16B, the slider disappears from the display screen of the display unit 301, and the function of the slider is allocated onto the housing surface of the device body 303 located at the right side of the display unit 301. In addition, the size of the slider allocated to the housing surface is larger than the display size so as to allow for an easier operation.

However, a slide bar having a function of indicating a display position is sometimes not visually confirmable, thus making it difficult to allocate the slider bar to a specific region. Scrolling may be realized by determining that the position first touched by the user's finger is the position of the slider bar.

This operational example is based on the assumption that the user is aware of which position the slider allocated to the invisible button is allocated to when the change button 330 is tapped.

Figure 17A:
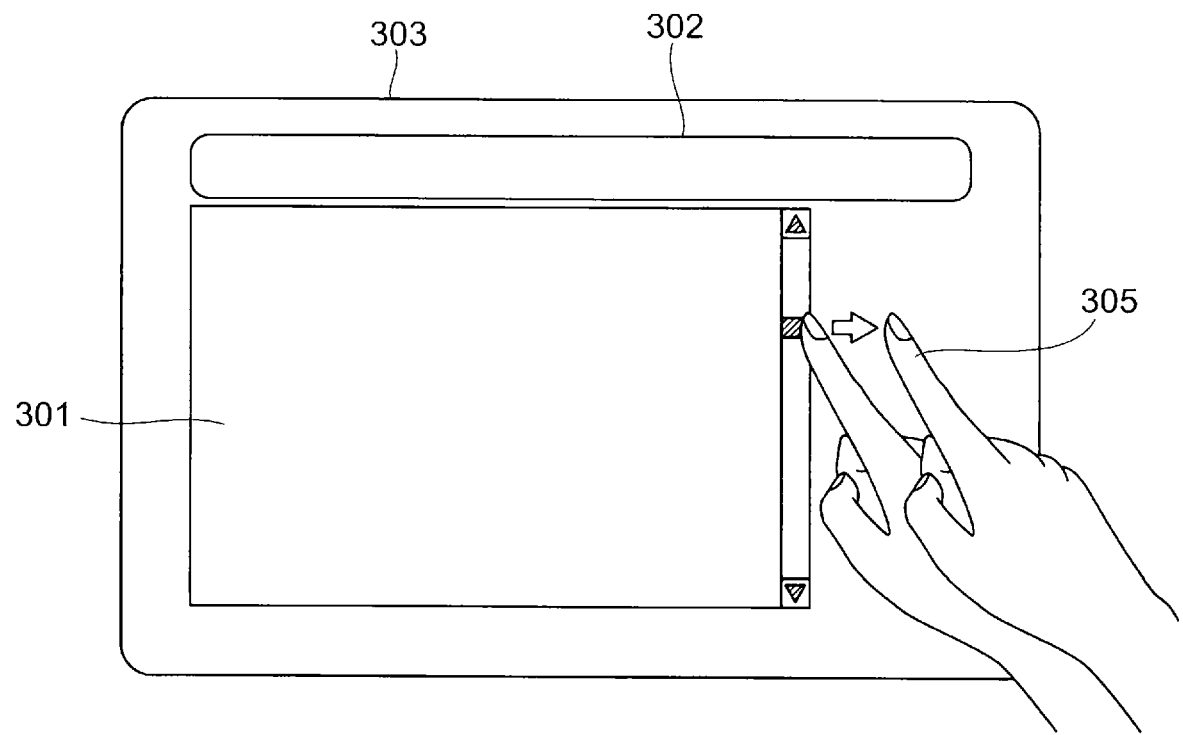
FIGS. 17A and 17B illustrate an example where a gesture (i.e., an operation input) of a user is used for making an operational function invisible.
Figure 17B:
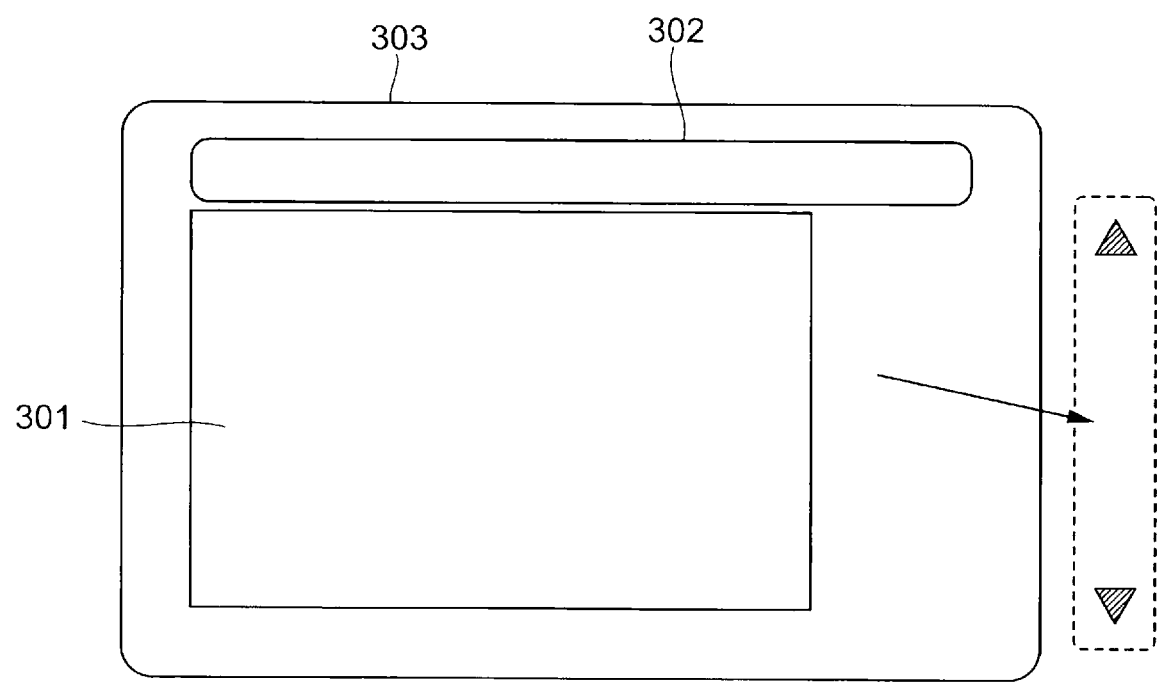

FIGS. 17A and 17B illustrate an example where a gesture (i.e., an operation input) of a user is used for making an operational function invisible.

FIG. 17A illustrates a state where a gesture is performed in which the index finger 305 tapping on the slider displayed on the display screen of the display unit 301 is moved outward (i.e., rightward) from the screen.

FIG. 17B illustrates the user interface 300 after the gesture. As shown in FIG. 17B, the slider disappears from the display screen of the display unit 301 and is allocated to the housing surface of the device body 303 located at the right side of the display unit 301. Because the gesture of the user is used, the user may operate the slider with no confusion. Moreover, the gesture may be used as an operation input for selecting an operational function to be made invisible.

Confirmation of Allocation Status

The following description relates to a case where the allocation status of an invisible button is to be confirmed during use.

Although a function of notifying the allocation status of an invisible button from the system side is provided, as mentioned above, this does not necessarily mean that the allocation status is notified when the user desires to confirm the allocation status.

The function of notifying the allocation status of an invisible button in response to an operation input by the user will be described below. The term "allocation status" refers to information about whether or not there is allocation, the type of an operational function to be allocated, and the allocation position.

Figure 18A:
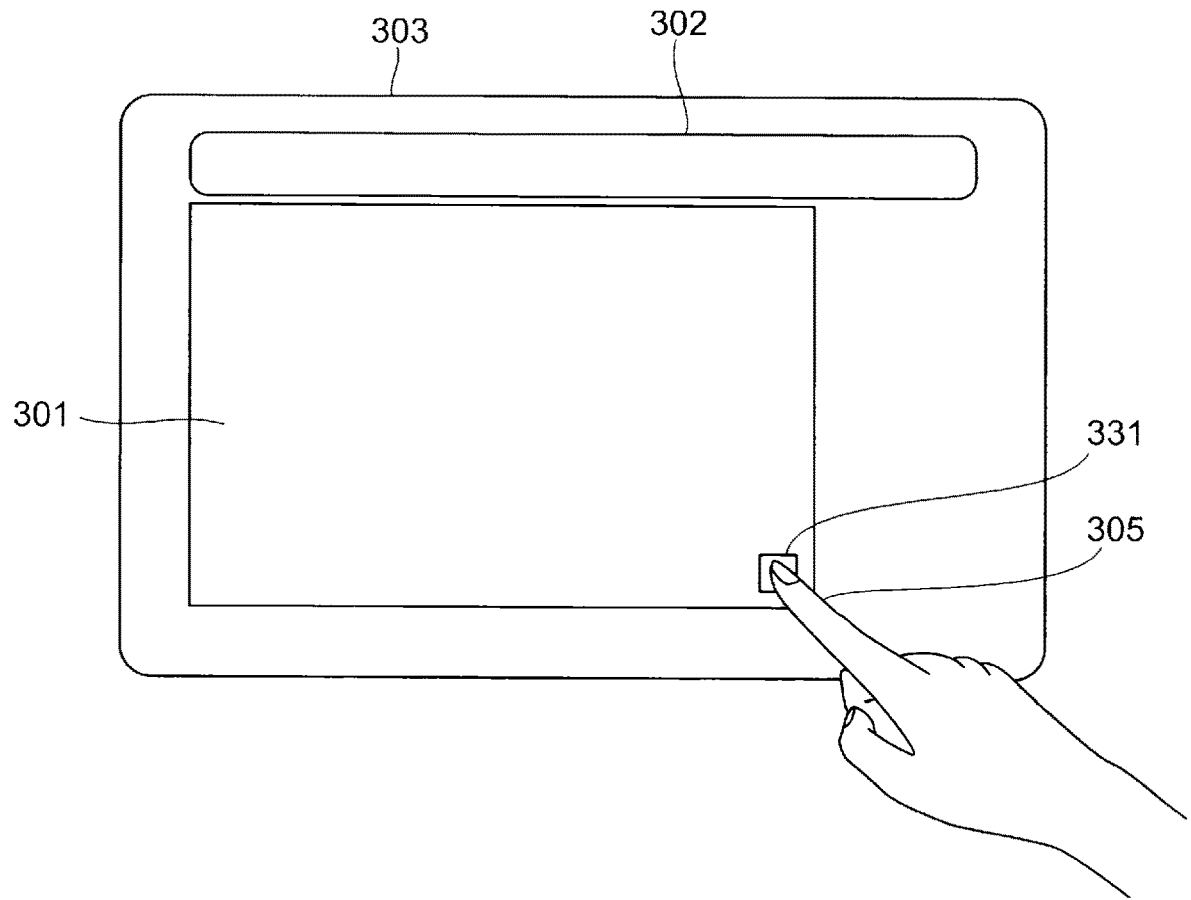
FIGS. 18A and 18B illustrate an example where the allocation status of invisible buttons is to be displayed by operating a check button.
Figure 18B:
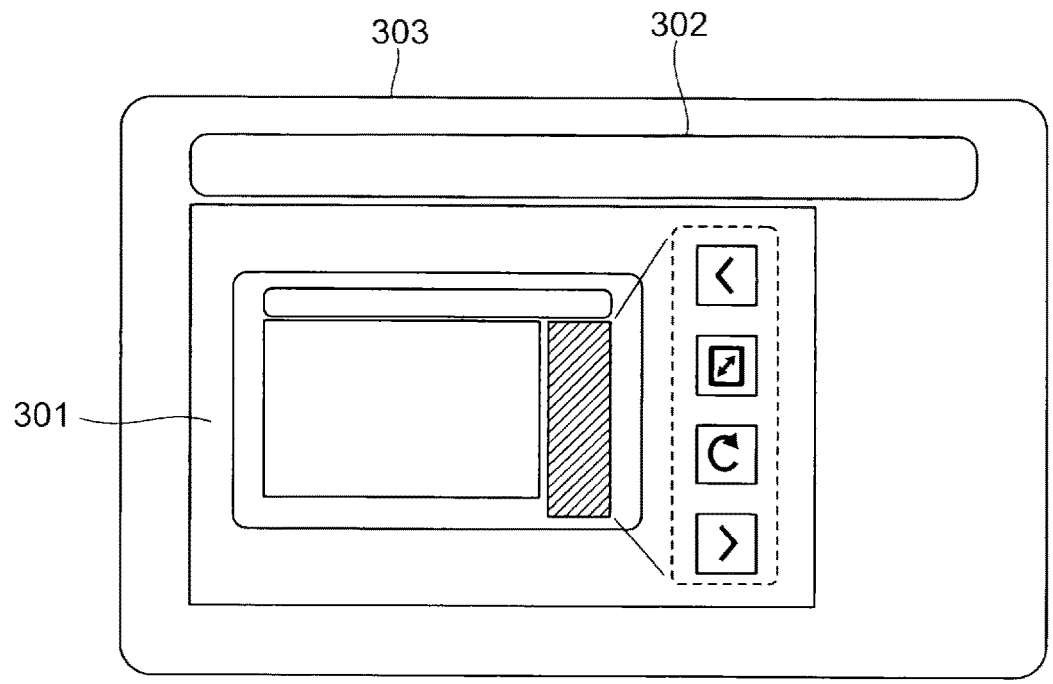

FIGS. 18A and 18B illustrate an example where the allocation status of invisible buttons is to be displayed by operating a check button 331.

FIG. 18A illustrates a state where the check button 331 displayed on the display screen of the display unit 301 is being tapped with the index finger 305. The check button 331 is an example of a mechanism prepared for checking the allocation status of an invisible button. As an alternative to the tapping of the check button 331, a specific operation, such as tapping or double-clicking of a predetermined region, may be employed.

FIG. 18B illustrates the user interface 300 after the check button 331 is operated. In this example, since invisible buttons are already allocated, the display unit 301 schematically shows the allocation positions and the allocated operational functions (i.e., prepared buttons).

In this example, the invisible buttons are disposed in a region at the right side of the display unit 301, that is, in a region of the housing surface of the device body 303 at the right side of the display unit 301. Moreover, the contents of the allocated operational functions are shown in correspondence with the allocation regions.

In this case, control buttons including "back", "expand", "reload", and "forward" buttons are displayed. With this display, the user is able to understand at any desired time what kind of operation is to be executed by tapping which of the regions.

Automatic Switching of Invisible Buttons

An automatic switching function of an operational function allocated as an invisible button will now be described. Specifically, the following description relates to a case where an operational function allocated as an invisible button is automatically switched in accordance with the contents displayed on the display unit 301 and the application being executed.

Figure 19A:
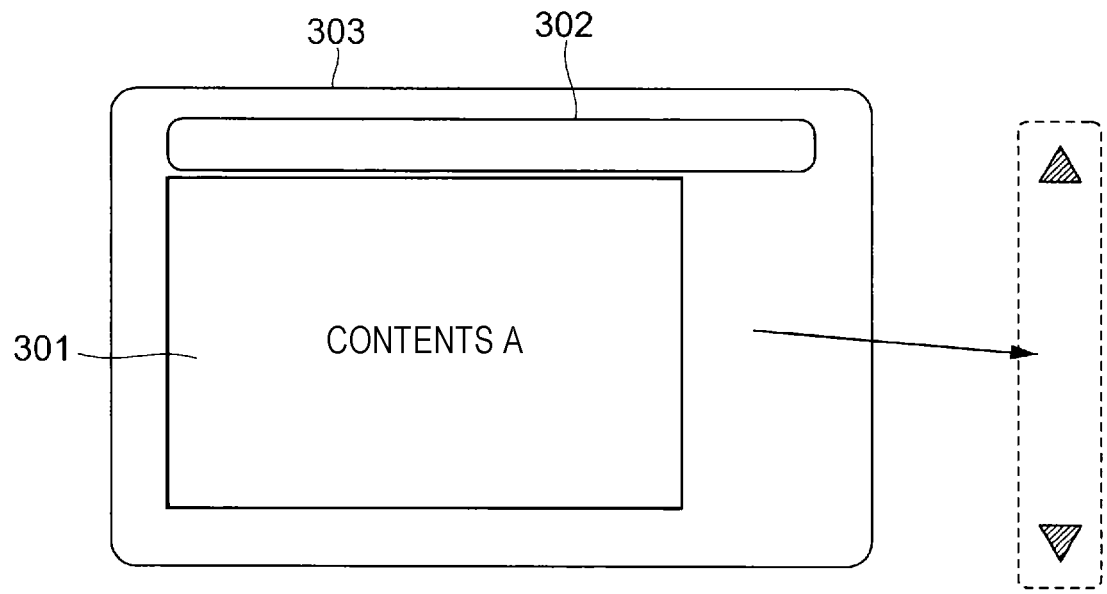
FIGS. 19A and 19B illustrate a state where operational functions allocated to invisible buttons are being switched in accordance with display contents.
Figure 19B:
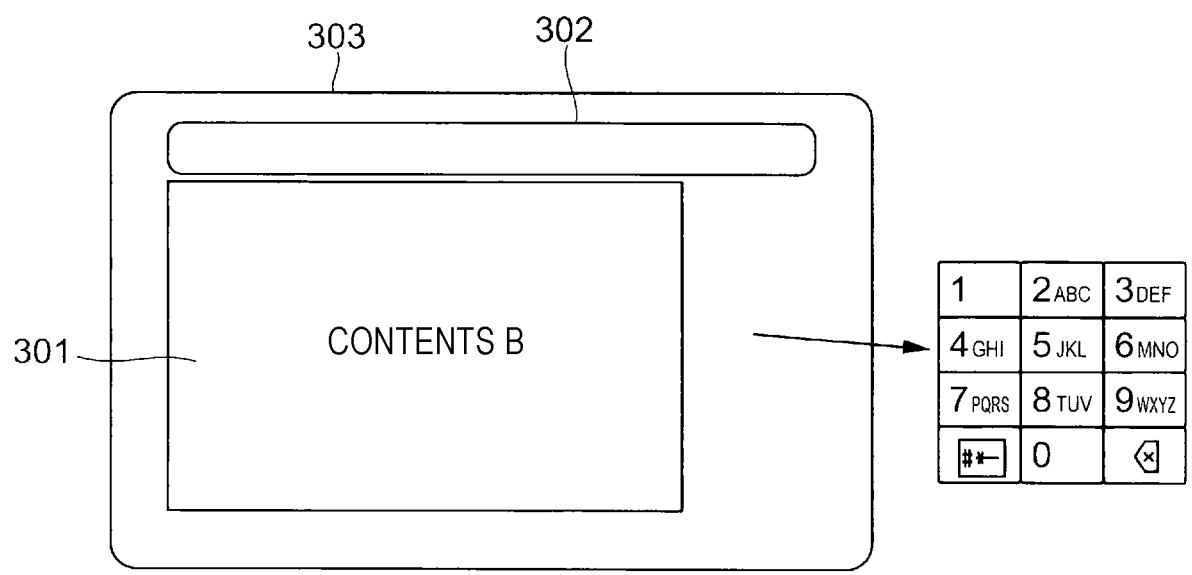

FIGS. 19A and 19B illustrate a state where operational functions allocated to invisible buttons are being switched in accordance with the display contents.

FIG. 19A illustrates a state where a slider for scrolling in the vertical direction is allocated to a region at the right side of the display unit 301 in a case where contents A are displayed on the display unit 301. This corresponds to a case where, for example, a text message is displayed.

FIG. 19B illustrates a state where a numerical keypad is allocated to a region at the right side of the display unit 301 in a case where contents B are displayed on the display unit 301. This corresponds to a case where, for example, an accounting document or a spreadsheet is displayed.

Figure 20A:
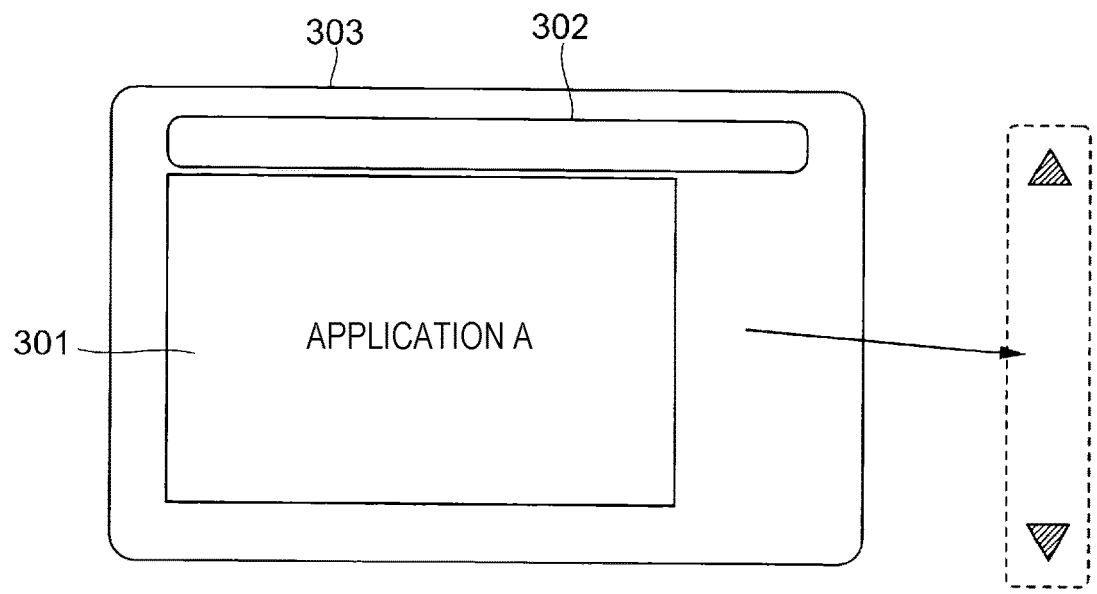
FIGS. 20A and 20B illustrate a state where operational functions allocated to invisible buttons are being switched in accordance with an application being executed.
Figure 20B:
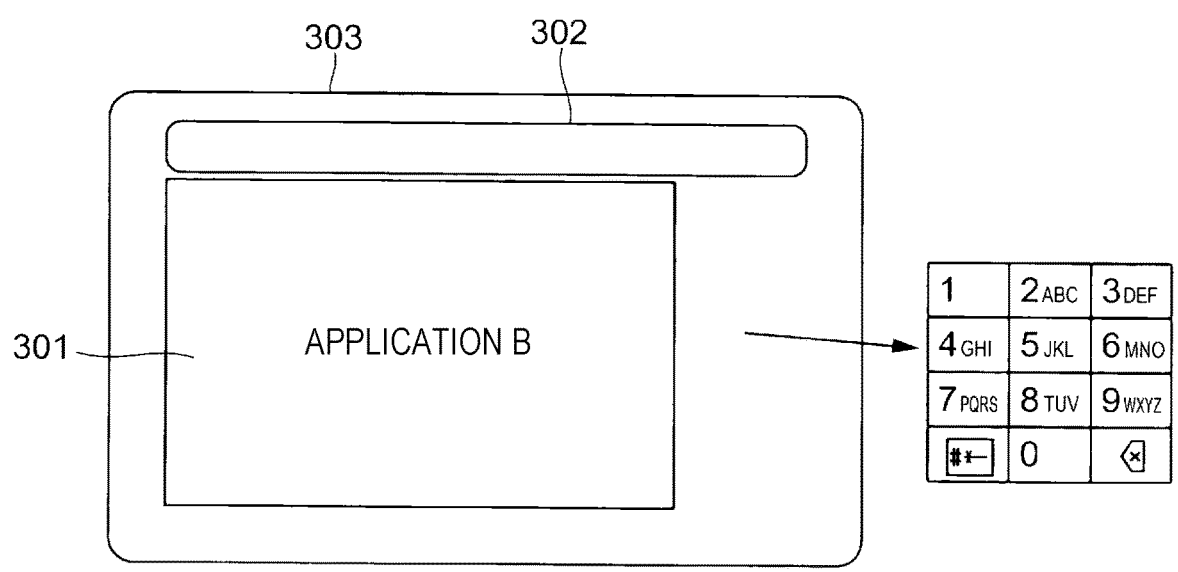

FIGS. 20A and 20B illustrate a state where operational functions allocated to invisible buttons are being switched in accordance with an application being executed.

FIG. 20A illustrates a state where a slider for scrolling in the vertical direction is allocated to a region at the right side of the display unit 301 in a case where an application A is displayed on the display unit 301. This corresponds to a case where, for example, word processing software is being executed.

FIG. 20B illustrates a state where a numerical keypad is allocated to a region at the right side of the display unit 301 in a case where an application B is displayed on the display unit 301. This corresponds to a case where, for example, accounting software or spreadsheet software is being executed.

Accordingly, by having the knowledge of operational functions allocated to invisible buttons in accordance with the display contents or the application being executed, operational functions allocated to invisible buttons are automatically switched, so that a process performed by the user for allocating an operational function to an invisible button may be omitted.

Another Example of Allocation Region

In the above description, a region to which an invisible button is allocated is outside the region of the display unit 301 within the detection region of the operation reception unit 302. Alternatively, the space above the display unit 301 may be used.

Figure 21:
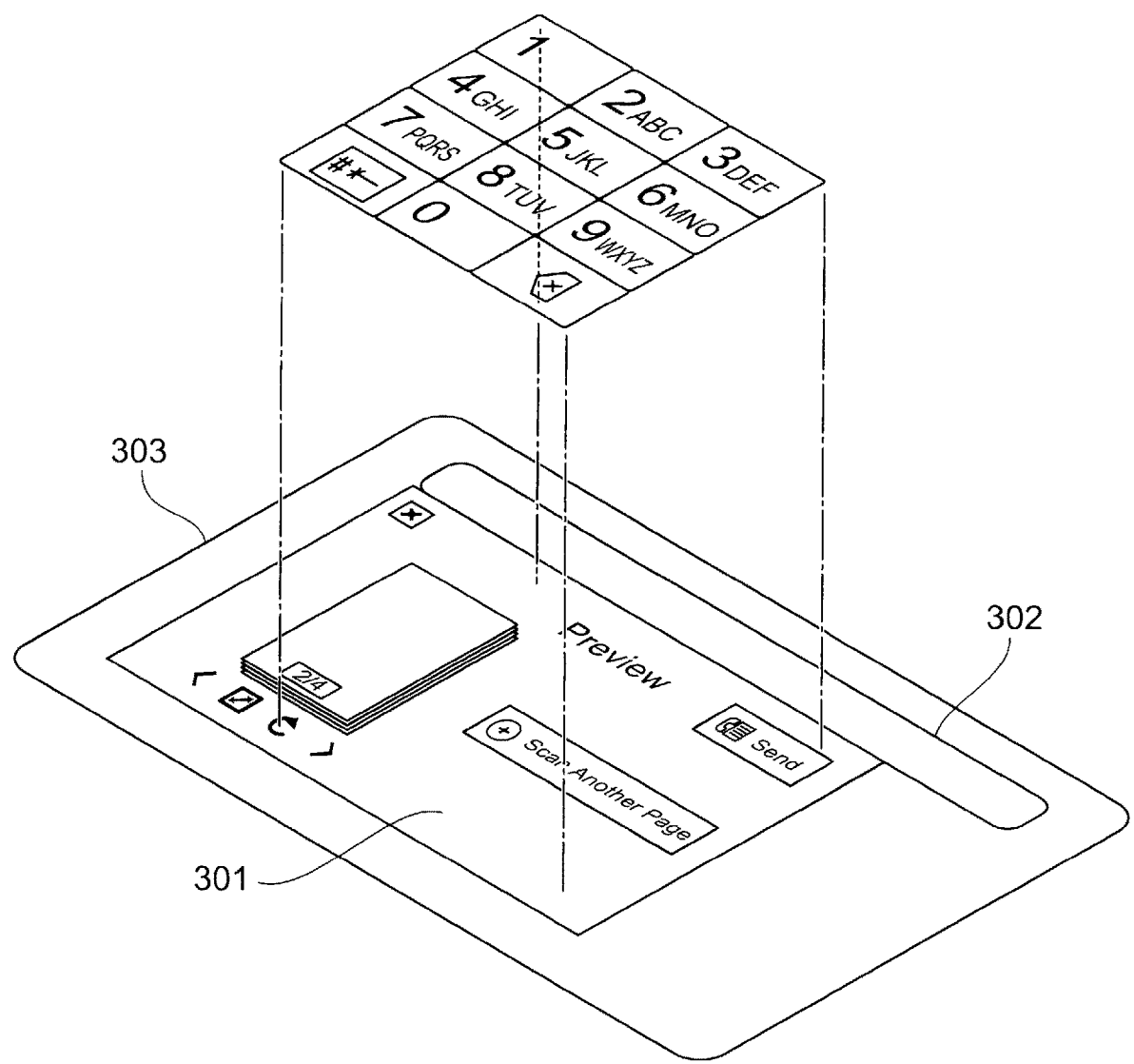
FIG. 21 illustrates an example where a numerical keypad is allocated as an invisible button within a detection region overlapping the display unit in addition to displayed operators (i.e., software buttons)

FIG. 21 illustrates an example where a numerical keypad is allocated as an invisible button in addition to the displayed operators (i.e., software buttons) within a detection region overlapping the display unit 301.

In this example, although multiple buttons are allocated to a single coordinate, the space overlapping the display unit 301 may be effectively utilized as the allocation region of an invisible button by preliminarily selecting whether or not an operation input with respect to an operator (i.e., visible button) displayed on the display unit 301 is to be received or an operation input with respect to an invisible button is to be received.

Furthermore, the invisible button may be allocated so as not to overlap with the operators (i.e., visible buttons) displayed on the display unit 301.

Second Exemplary Embodiment

In the first exemplary embodiment, the invisible-button allocating function is applied to the user interface 300 of the image forming apparatus 1. In the second exemplary embodiment, the invisible-button allocating function is applied to a portable information terminal.

Figure 22:
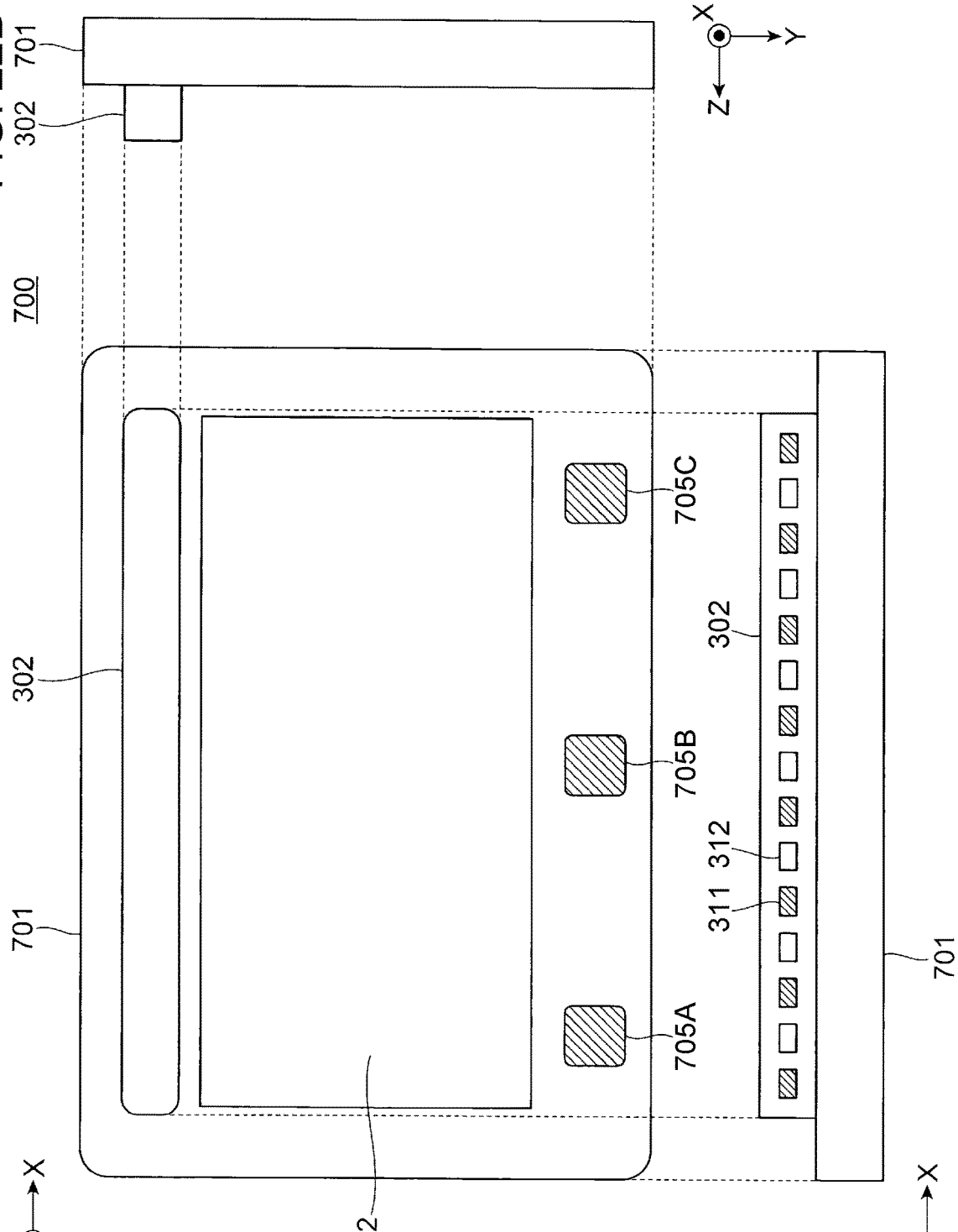
FIG. 22A is a top view of a tablet-type information terminal according to a second exemplary embodiment.
FIG. 22B is a side view of the information terminal.
FIG. 22C is a front view of the information terminal.

FIG. 22A is a top view of a tablet-type information terminal 700 according to the second exemplary embodiment, FIG. 22B is a side view of the information terminal 700, and FIG. 22C is a front view of the information terminal 700.

The information terminal 700 is an example of an information processing device. The information terminal 700 may be, for example, a smartphone or a gaming device.

The upper surface of a device body 701 of the information terminal 700 is provided with a display unit 702 that displays a display image and an operation reception unit 302 that optically detects an operated position of an input object. The operation reception unit 302 is a noncontact coordinate input device, as described in the first exemplary embodiment. The difference from the first exemplary embodiment is that the length of the operation reception unit 302 is equal to the length of the display unit 702 in the X-axis direction.

Icons (such as a mark 705A indicating the embedded position of a near field communication chip, a home button 705B, and a power button 705C) are printed on the upper surface of the device body 701 according to this exemplary embodiment. These icons are an example of visible buttons and are also an example of hardware buttons in that they have fixed detection ranges.

The mark 705A is used when communicating with a near-field-communication-compliant device. The home button 705B is used when making a command for returning to a preregistered home screen. The power button 705C is used when turning the power on or off. Needless to say, the functions allocated to these icons are merely examples.

Figure 23:
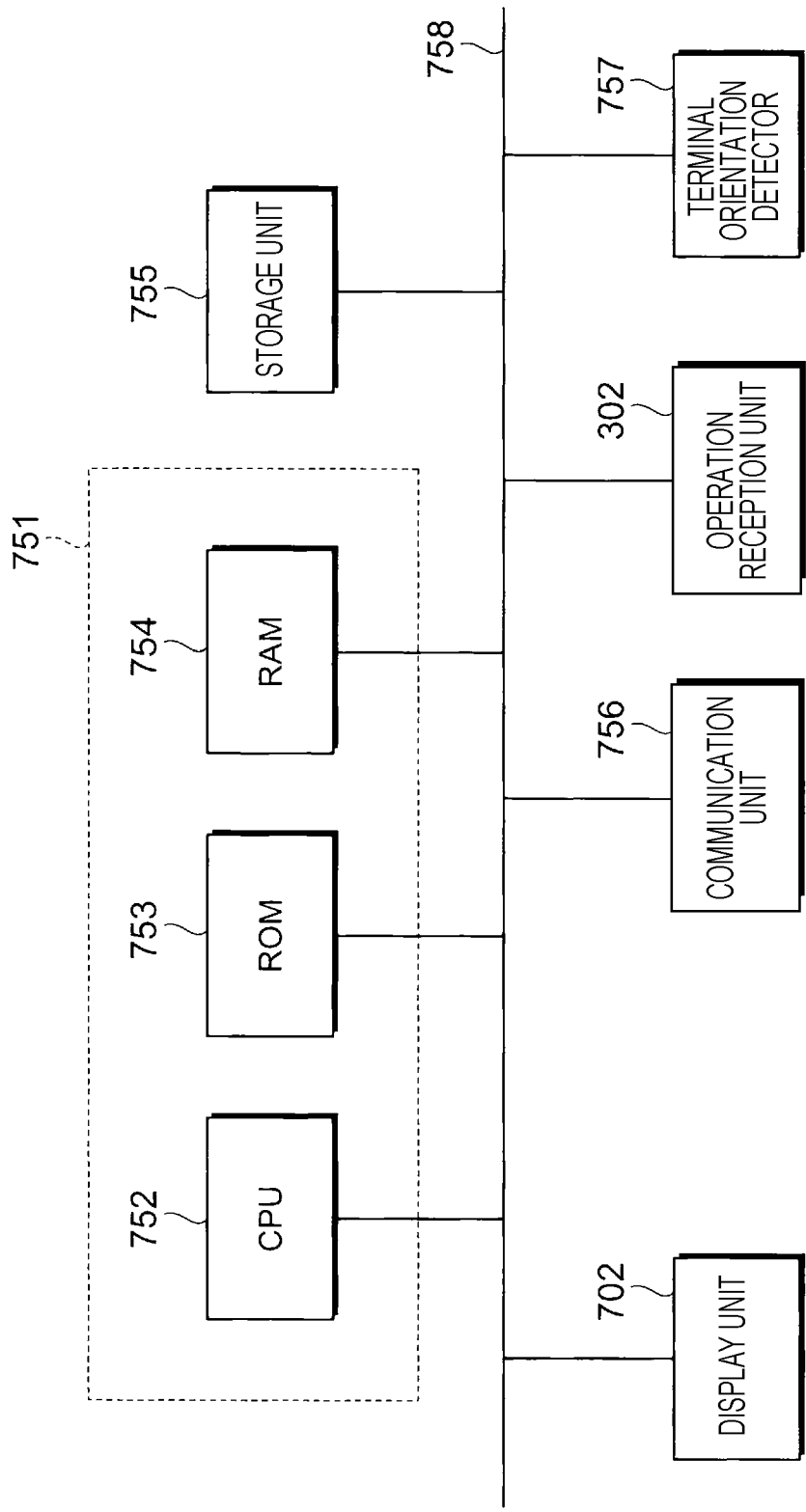
FIG. 23 illustrates a functional block example of a controller and other units constituting the information terminal.

FIG. 23 illustrates a functional block example of a controller 751 and other units constituting the information terminal 700.

The information terminal 700 includes the controller 751 that controls the entire device, the display unit 702 used for displaying an image, the operation reception unit 302 that detects the coordinate position of an input object moving across a detection plane, a storage unit 755 used for storing various types of data and programs, a communication unit 756 used for communicating with an external device, and a terminal orientation detector 757 that detects the orientation of the device body 701 when being used.

These units are connected to one another via, for example, a bus 758 and exchange data via the bus 758.

The controller 751 includes a CPU 752, a ROM 753, and a RAM 754. The ROM 753 stores a program to be executed by the CPU 752. The CPU 752 uses the RAM 754 as a work area and executes the program loaded from the ROM 753, whereby each unit of the information terminal 700 is controlled.

The controller 751 according to this exemplary embodiment provides a function as an input device together with the operation reception unit 302.

The display unit 702 is constituted of a liquid-crystal display panel or an electroluminescence (EL) display panel.

The operation reception unit 302 is integrally attached to the surface of the device body 701.

The storage unit 755 is constituted of, for example, a hard disk device or a semiconductor memory device.

The communication unit 756 is constituted of, for example, a wireless LAN interface.

The terminal orientation detector 757 includes, for example, an acceleration sensor and a geomagnetic sensor. In this exemplary embodiment, assuming that the side of the device body 701 at which the operation reception unit 302 is disposed is defined as an upper edge, the roll about the Y axis (see FIGS. 22A to 22C), the pitch about the X axis (see FIGS. 22A to 22C), and the azimuth about the Z axis (see FIGS. 22A to 22C) are detected.

The terminal orientation detector 757 uses the rotational information and azimuth information about these axes to detect which side of the device body 701 is the upper side.

An example of an operation unique to the tablet-type information terminal 700 will be described below. The function of the operation-input detection functioning unit 600 (see FIG. 7) is provided by the controller 751.

Figure 24:
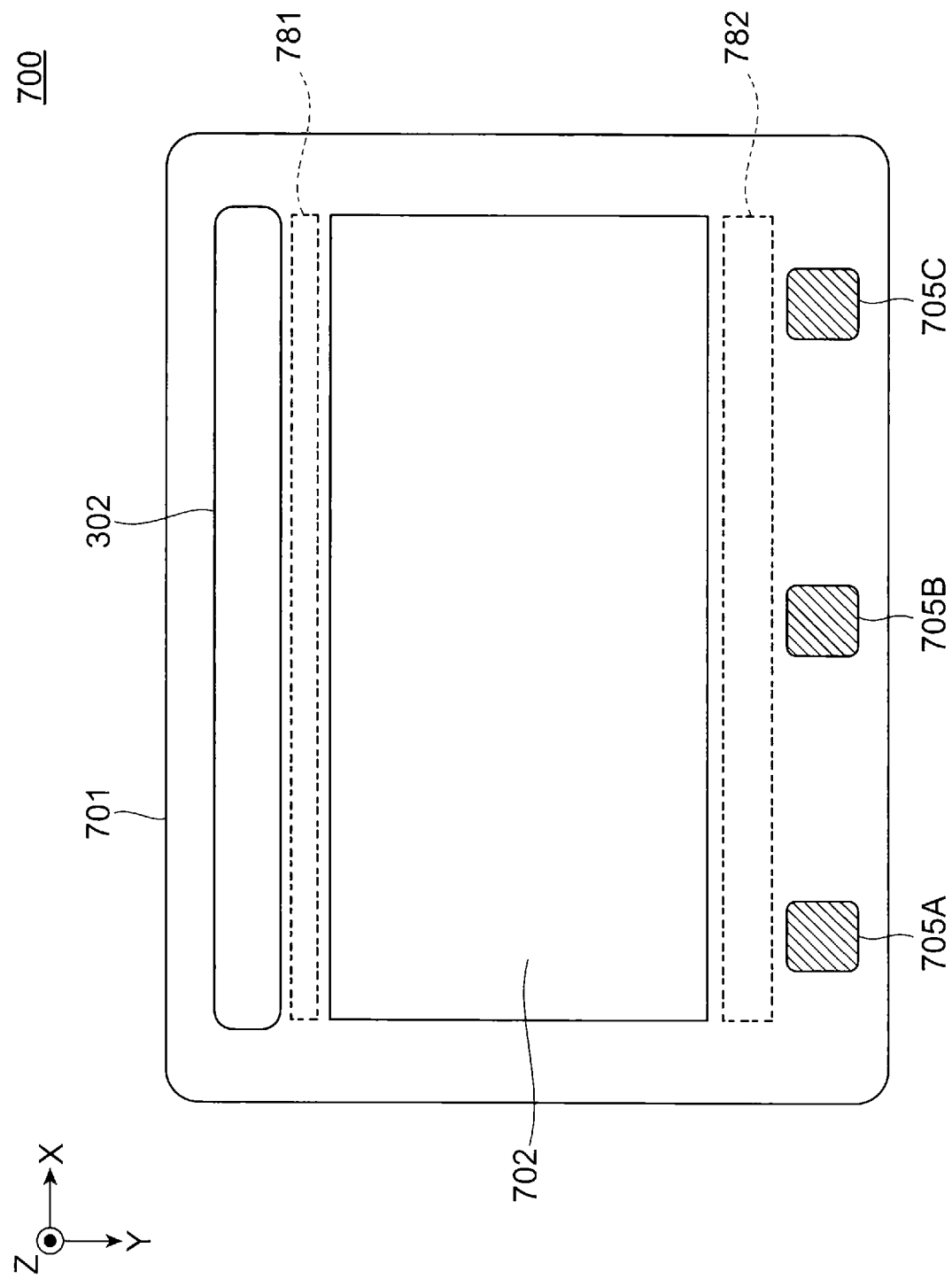
FIG. 24 illustrates characteristic allocation regions of the information terminal used in this exemplary embodiment.

FIG. 24 illustrates characteristic allocation regions 781 and 782 of the information terminal 700 used in this exemplary embodiment.

The allocation region 781 is a space between the display unit 702 and the operation reception unit 302 and is used for, for example, allocating a slider for scrolling an image in the horizontal direction. The allocation region 782 is a space between the display unit 702 and the icons (i.e., the mark 705A, the home button 705B, and the power button 705C) and is used for, for example, allocation of control buttons (i.e., "back", "expand", "reload", and "forward" buttons).

Figure 25A:
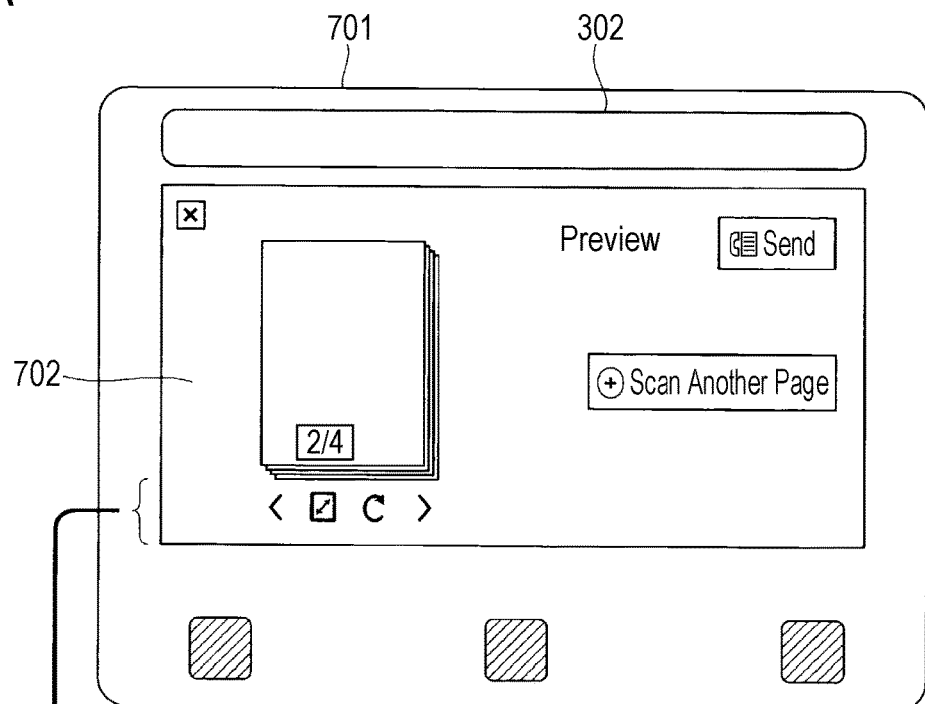
FIGS. 25A and 25B illustrate a state where control buttons displayed on the display unit are allocated as invisible buttons to an allocation region.
Figure 25B:
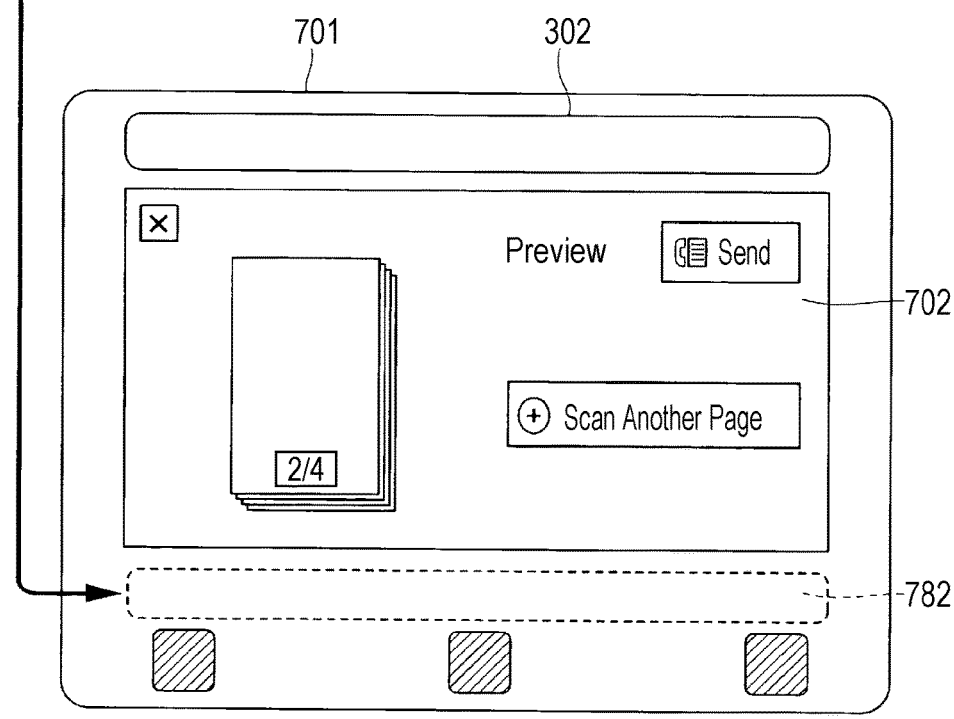

FIGS. 25A and 25B illustrate a state where the control buttons displayed on the display unit 702 are allocated as invisible buttons to the allocation region 782.

FIG. 25A illustrates a state where the control buttons (i.e., "back", "expand", "reload", and "forward" buttons) are displayed on the display unit 702.

FIG. 25B illustrates a state where, for example, an image of a page to be checked, which is displayed on the display unit 702, is expanded as a result of the control buttons displayed on the display unit 702 being allocated as invisible buttons to the allocation region 782.

In this example, an operation input to an invisible button whose existence is not visually confirmable is detected by the operation reception unit 302, and a corresponding operation may be executed, as in the case of the first exemplary embodiment.

A modification of the information terminal 700 will be described below.

Figure 26:
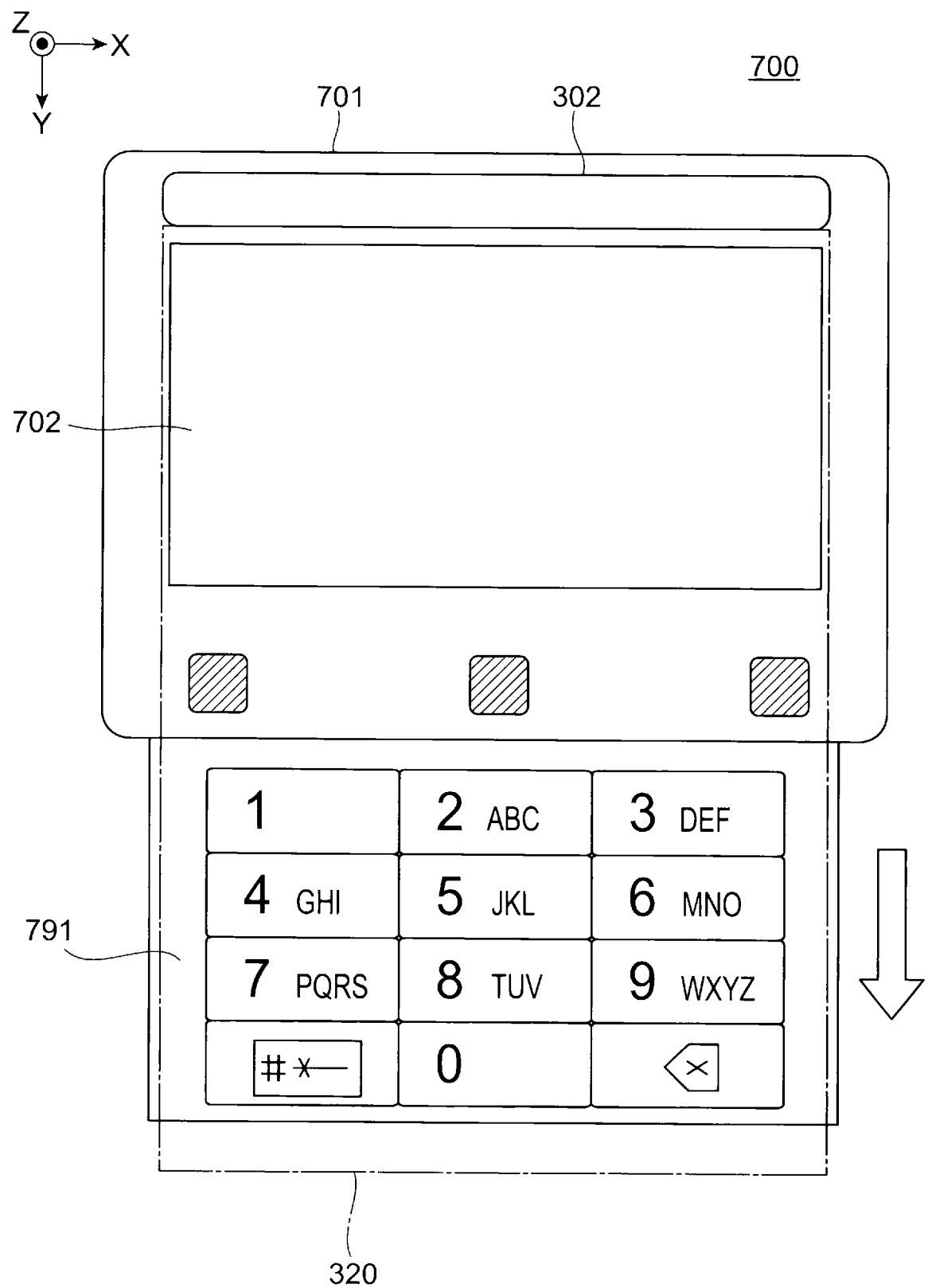
FIG. 26 illustrates an example of the information terminal accommodating a pullout board.

FIG. 26 illustrates an example of the information terminal 700 accommodating a pullout board 791.

In the example in FIG. 26, a numerical keypad is printed on the surface of the board 791. As shown in FIG. 26, when the board 791 is pulled out, an end thereof is located within the detection region 320. Therefore, an operation input to the board 791 is detectable by the operation reception unit 302.

With buttons printed on the board 791, invisible buttons allocated within the detection region 320 may be treated the same as visible buttons.

Although a numerical keypad is printed on the board 791 in the example in FIG. 26, the contents to be printed may be a keyboard with an array of alphabet characters, a keyboard with an array of numbers, or a keyboard corresponding to a specific language.

As an alternative to the device body 701 shown in FIG. 26 in which only a single board 791 is accommodated therein, multiple boards 791 with different contents printed thereon may be accommodated in the device body 701. In this case, the user may pull out any desired one of the boards 791 and use it. The board 791 in this case is an example of a movable member.

Furthermore, as an alternative to the example in FIG. 26 in which the board 791 is used by being pulled out from the device body 701, the board 791 may be a plate-shaped movable member. This plate-shaped movable member may be accommodated in a folded state in the device body 701, may be a rotatable or slidable cover used for protecting the surface of the device body 701 when not in use, or may be a plate-shaped member that is rotationally taken out from the back side to the front side of the device body 701 when in use.

As an alternative to the case of FIG. 26 in which information corresponding to invisible buttons is printed on the surface of the board 791, the board 791 may be a plain board with no information corresponding to invisible buttons printed thereon or may have information with no relation to invisible buttons printed thereon. As mentioned above, this is because an operation input with respect to an invisible button is detected and performed independently of visually-existing information.

As described above in the first exemplary embodiment, the arrangement and the positions of the buttons prepared with respect to the operational functions allocated as invisible buttons are desirably confirmable on the display screen of the display unit 702.

Figure 27:
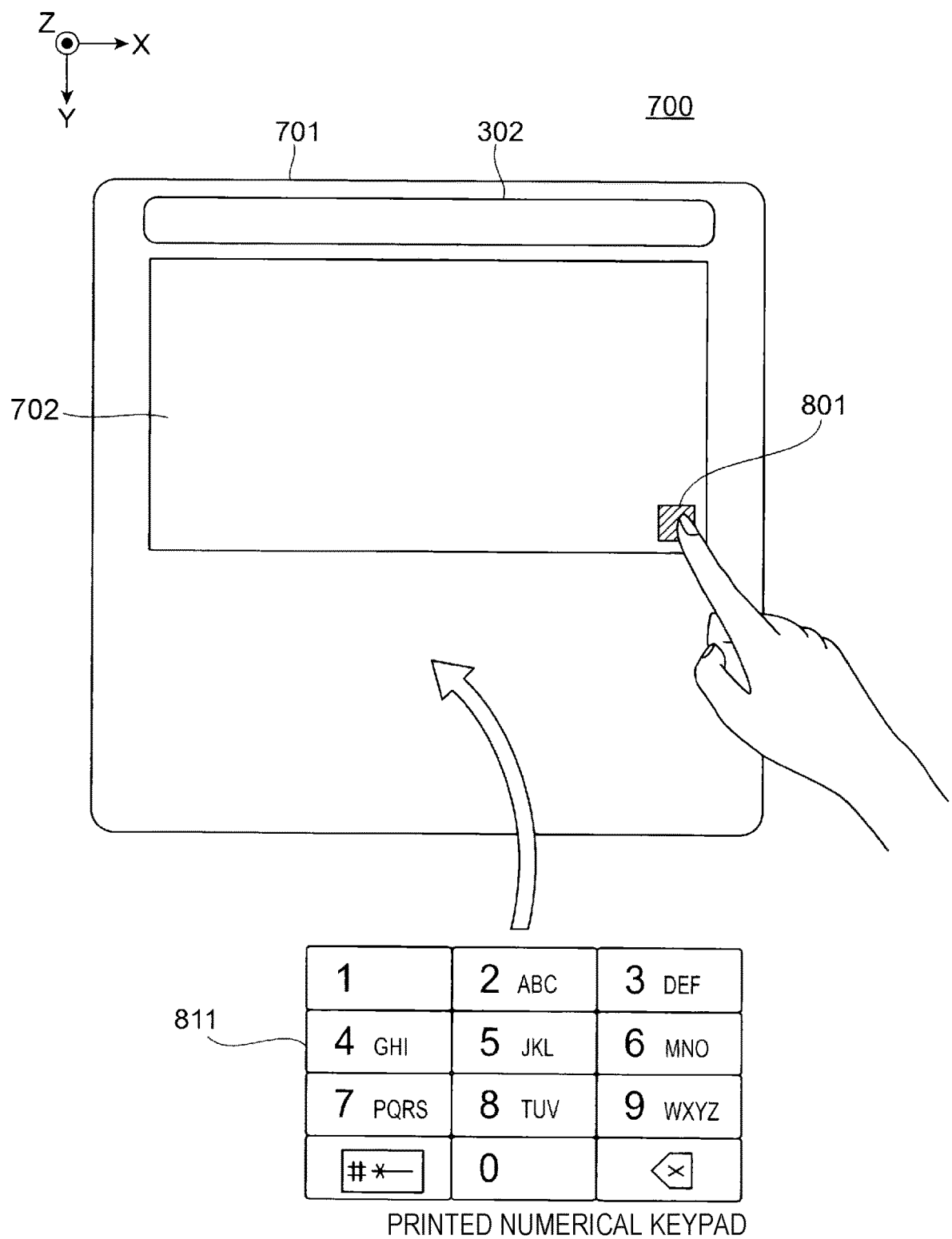
FIG. 27 illustrates an example of the information terminal provided with a free area corresponding to the board outside a lower edge of the display unit.

FIG. 27 illustrates an example of the information terminal 700 provided with a free area corresponding to the board 791 (see FIG. 26) outside the lower edge of the display unit 702.

In the information terminal 700 shown in FIG. 27, a print button 801 for printing an operational function allocated as an invisible button is displayed on the screen of the display unit 702. This print button 801 may be set to be displayed only when the invisible button is allocated.

When the user taps on the print button 801, the information terminal 700 communicates with a communicable printer (not shown) and commands the printer to print out an image of an allocated operational function. Because the allocated operational function is a numerical keypad in the case of FIG. 27, a numerical keypad printed on paper (referred to as "paper numerical keypad" hereinafter) 811 is printed out.

Subsequently, the user may place the printed paper numerical keypad 811 on the housing surface of the device body 701 and perform an operation input while visually checking the arrangement of the buttons prepared as invisible buttons.

Accordingly, although the existence of the invisible buttons is not visually confirmable, the print button 801 is prepared on the display unit 702 so that an inexperienced user may perform an operation input while checking the allocation positions of the invisible buttons.

As an alternative to the case of FIG. 27 in which the free area corresponding to the allocation region of invisible buttons exists in the device body 701 of the information terminal 700, this area may have a hardware button disposed therein, or such a free area does not have to exist in the device body 701 to begin with. For example, if the information terminal 700 is to be used on a desk, a similar operation input may be performed by setting the paper numerical keypad 811 on the desk.

Needless to say, the contents to be printed out are not limited to the paper numerical keypad since the contents depend on the type of invisible button to be allocated.

Figure 28A:
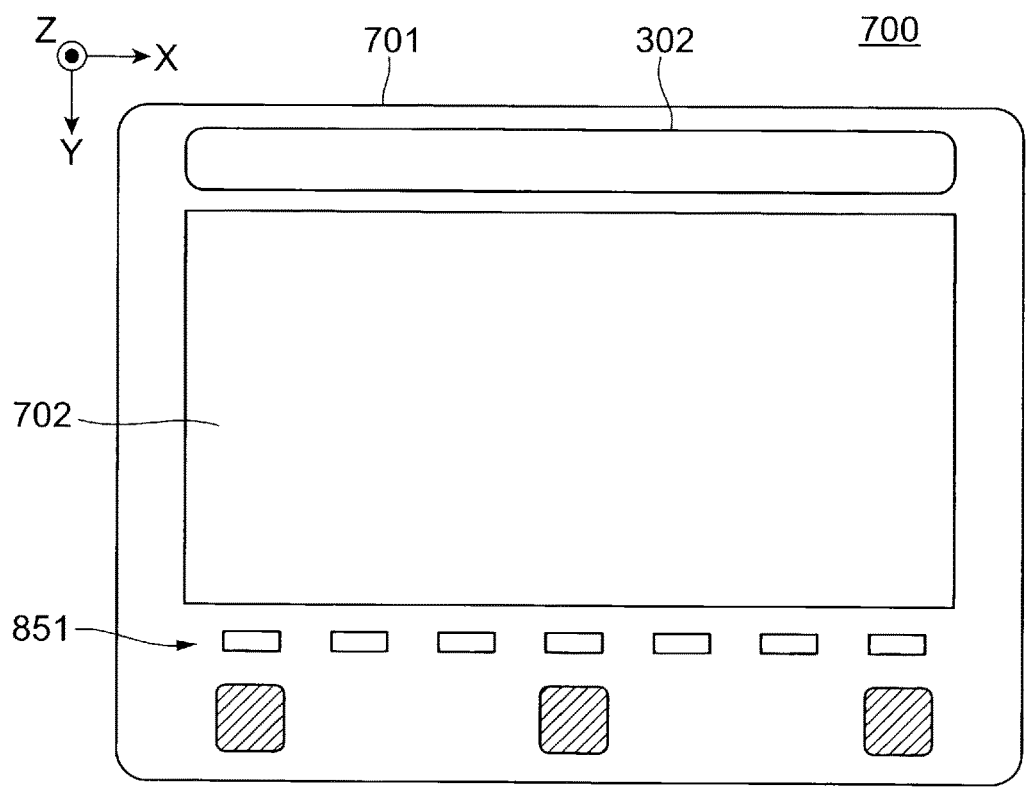
FIGS. 28A and 28B illustrate an example of the information terminal having multiple light emitting diodes (LEDs) arranged in a row between the display unit and icons.
Figure 28B:
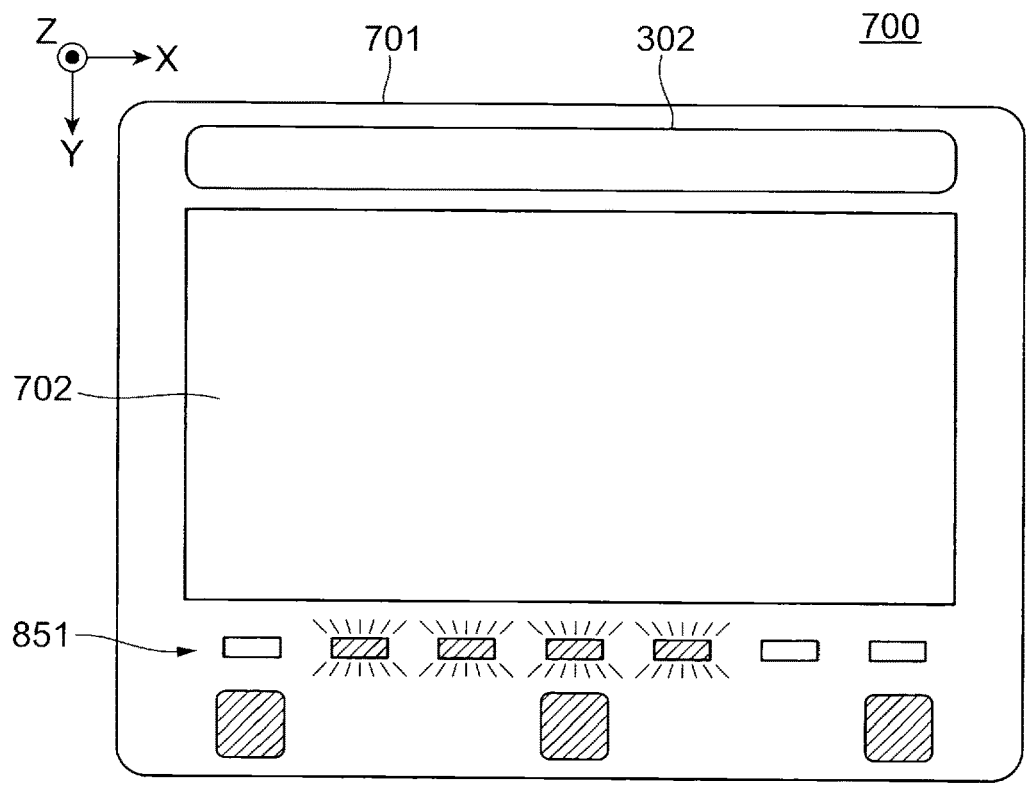

FIGS. 28A and 28B illustrate an example of the information terminal 700 having multiple LEDs 851 arranged in a row between the display unit 702 and the icons (i.e., the mark 705A, the home button 705B, and the power button 705C).

In FIGS. 28A and 28B, seven LEDs 851 are arranged. The LEDs 851 are used as a guide for the allocation status and the allocation positions of invisible buttons.

FIG. 28A illustrates a state where invisible buttons are not allocated. Therefore, the seven LEDs 851 are in an unlit state.

FIG. 28B illustrates a state where invisible buttons are allocated. In this example, second, third, fourth, and fifth LEDs 851 from the left are lit, meaning that invisible buttons are allocated to the ranges of these four LEDs 851. In the case of the information terminal 700 shown in FIGS. 28A and 28B, although the user does not know the specific allocation position of each invisible button, the user may operate the invisible button while knowing the approximate position thereof to which the invisible button is allocated, so that the possibility of a misoperation may be reduced.

Figure 29A:
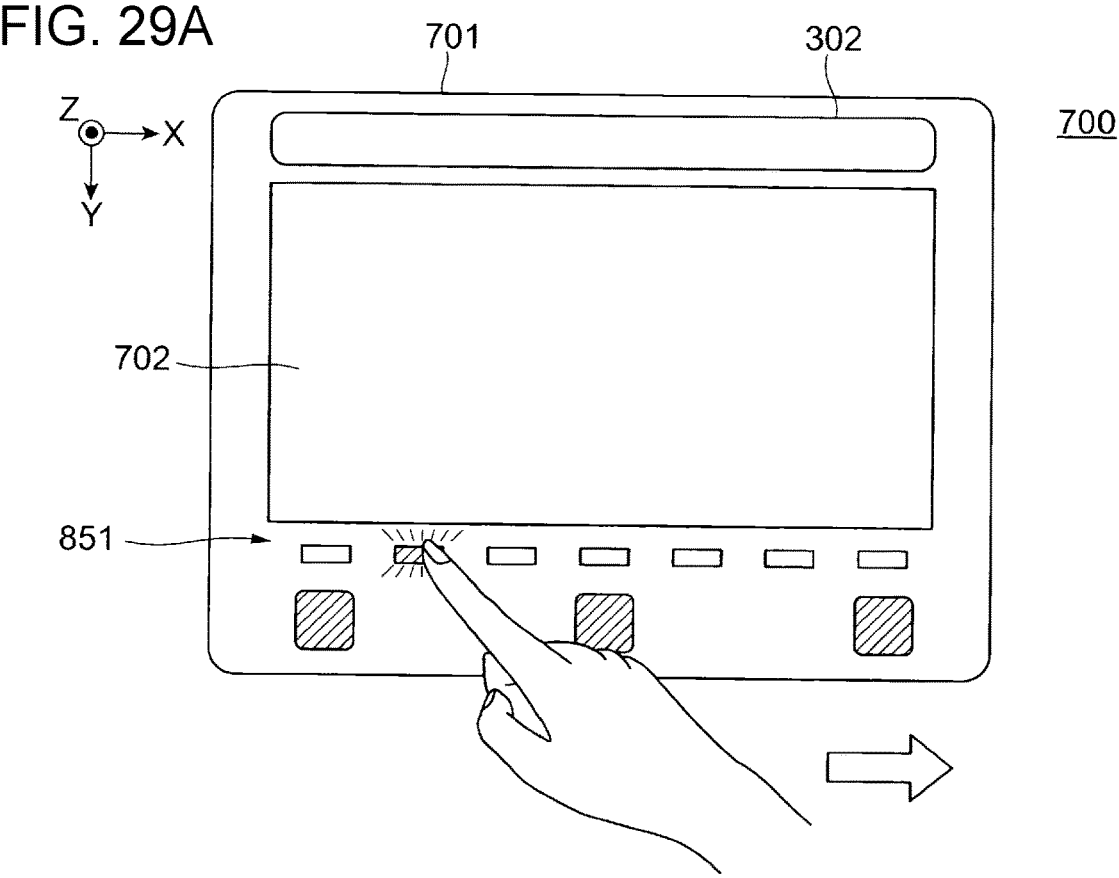
FIGS. 29A and 29B illustrate an example where the position of a display screen displayed on the display unit is expressed in cooperation with a sliding operation performed by the user by using seven LEDs.
Figure 29B:
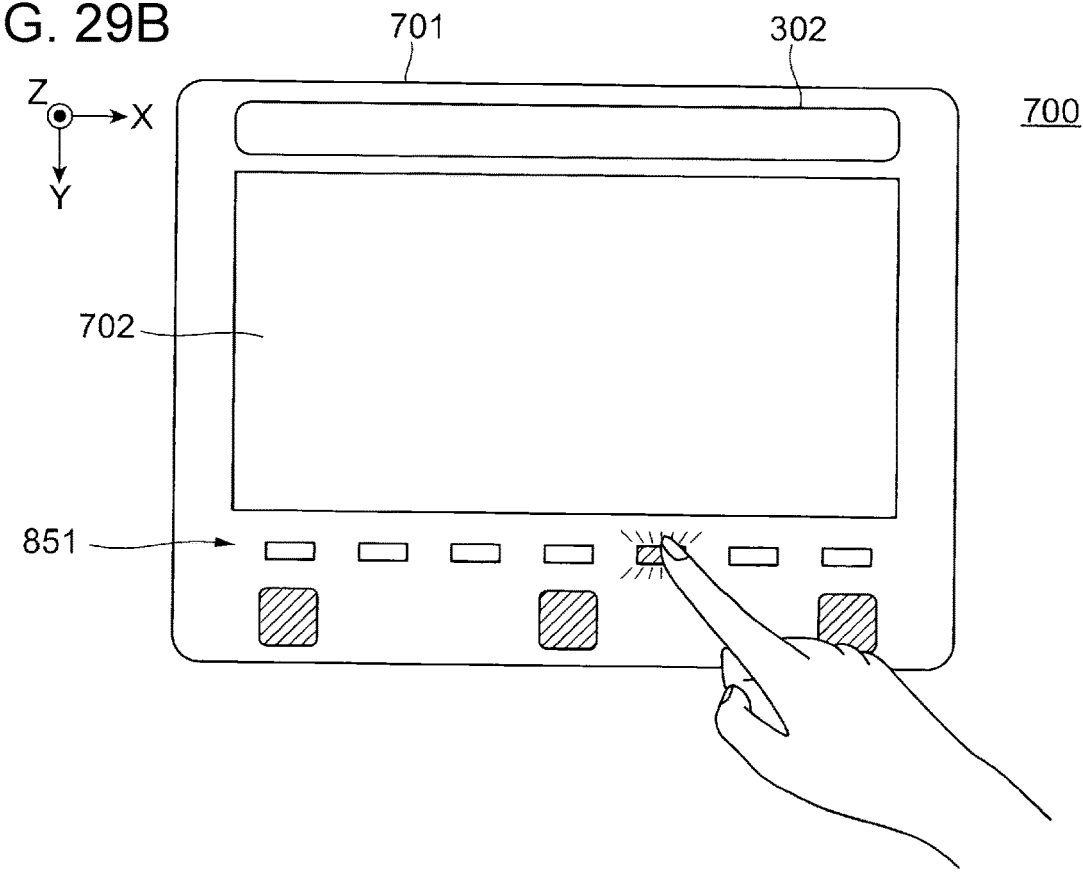

FIGS. 29A and 29B illustrate an example where the position of the display screen displayed on the display unit 702 is expressed in cooperation with a sliding operation performed by the user by using the seven LEDs 851.

In a case where a slider for scrolling the screen in the horizontal direction is allocated as an invisible button, since the position of a slide bar indicating the display position is variable, the allocation is not performed in the above-described example. However, in the case where the LEDs 851 are arranged as in FIGS. 29A and 29B, the slide bar may be expressed in accordance with lit positions of the LEDs 851. In this case, the user may perform a scrolling operation while being conscious of where the display position is located.

Figure 30A:
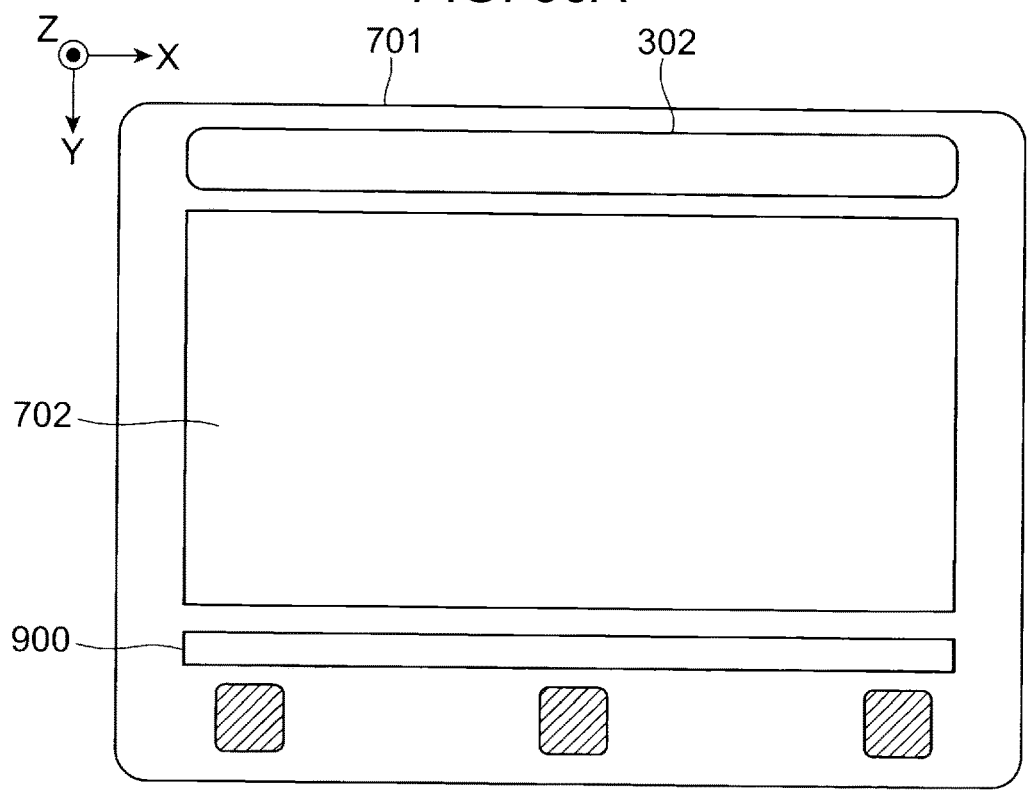
FIGS. 30A and 30B illustrate an example of the information terminal having an LED panel, which has multiple LEDs arranged in a matrix, disposed between the display unit and the icons.
Figure 30B:
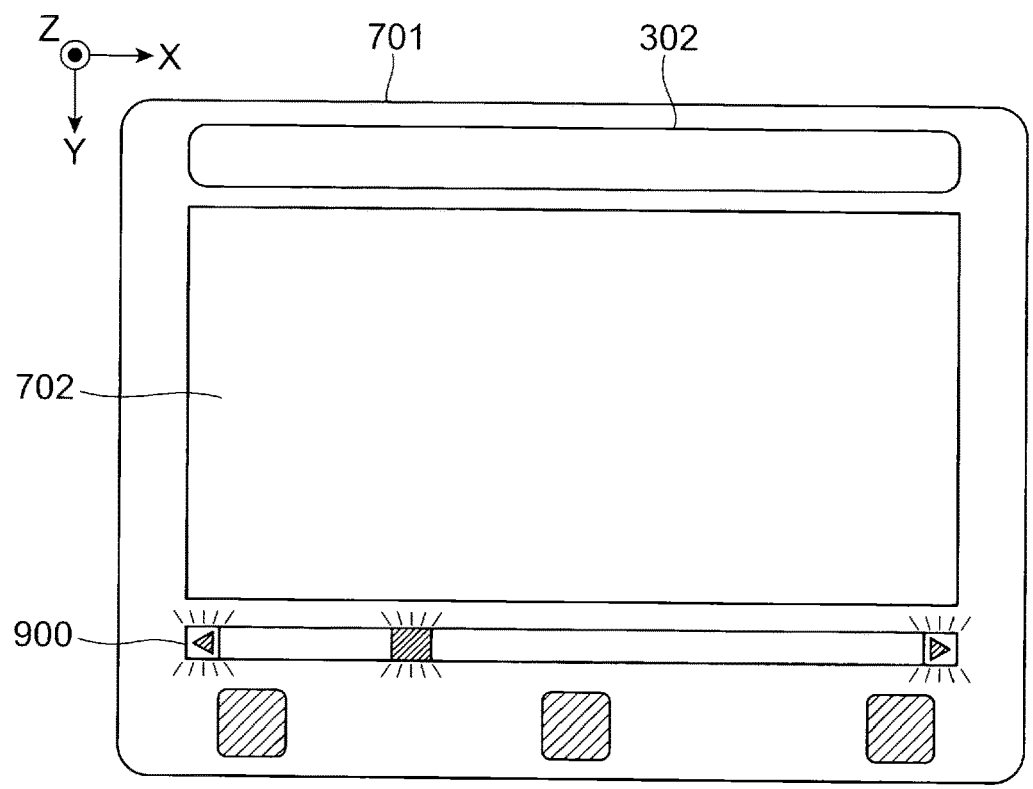

FIGS. 30A and 30B illustrate an example of the information terminal 700 having an LED panel 900, which has multiple LEDs arranged in a matrix, disposed between the display unit 702 and the icons (i.e., the mark 705A, the home button 705B, and the power button 705C).

FIG. 30A illustrates a state where invisible buttons are not allocated. Therefore, the LED panel 900 is not lit.

FIG. 30B illustrates a state where invisible buttons are allocated. In this example, a slider for scrolling the screen in the horizontal direction is allocated to the LED panel 900, and LEDs are lit in the LED panel 900 such that a button for scrolling in the left direction, a slide bar, and a button for scrolling in the right direction are displayed.

In the case of the information terminal 700 shown in FIGS. 30A and 30B, the user may operate each invisible button while knowing the specific allocation position thereof, so that the possibility of a misoperation may be reduced.

Needless to say, the slider shown in FIGS. 30A and 30B is merely an example, and a pattern according to each allocated operational function may be displayed on the LED panel 900.

Third Exemplary Embodiment

In the above exemplary embodiments, the operation reception unit 302 (see FIGS. 4A to 4C) is integrated with (fixed to) the device body 303. In this exemplary embodiment, the operation reception unit 302 is attachable to and detachable from the device body.

Figure 31:
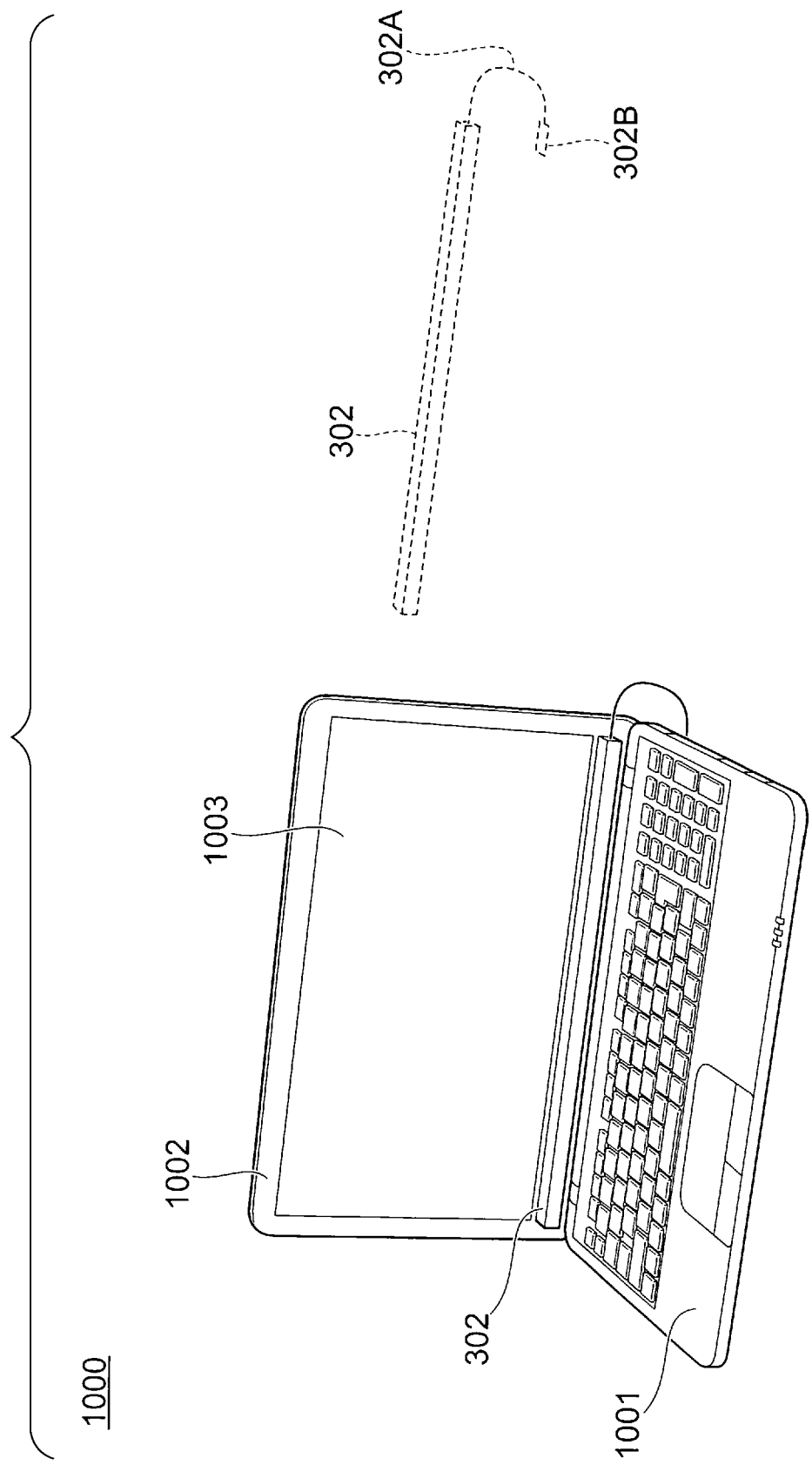
FIG. 31 illustrates an example of the external configuration of an information terminal according to a third exemplary embodiment to and from which the operation reception unit is attachable and detachable.

FIG. 31 illustrates an example of the external configuration of an information terminal 1000 according to a third exemplary embodiment to and from which the operation reception unit 302 is attachable and detachable. In this example, the information terminal 1000 is a notebook computer. The information terminal 1000 has a device body 1001 containing an electronic substrate and a hard disk device, and a cover 1002 having a display unit 1003.

In this exemplary embodiment, the operation reception unit 302 is stored in an independent housing, and a connector 302B is attached to one end of the housing via a cable 302A. The connector 302B is for connecting to the device body 1001 and is used for data communication as well as for receiving electric power from the device body 1001.

Figure 32:
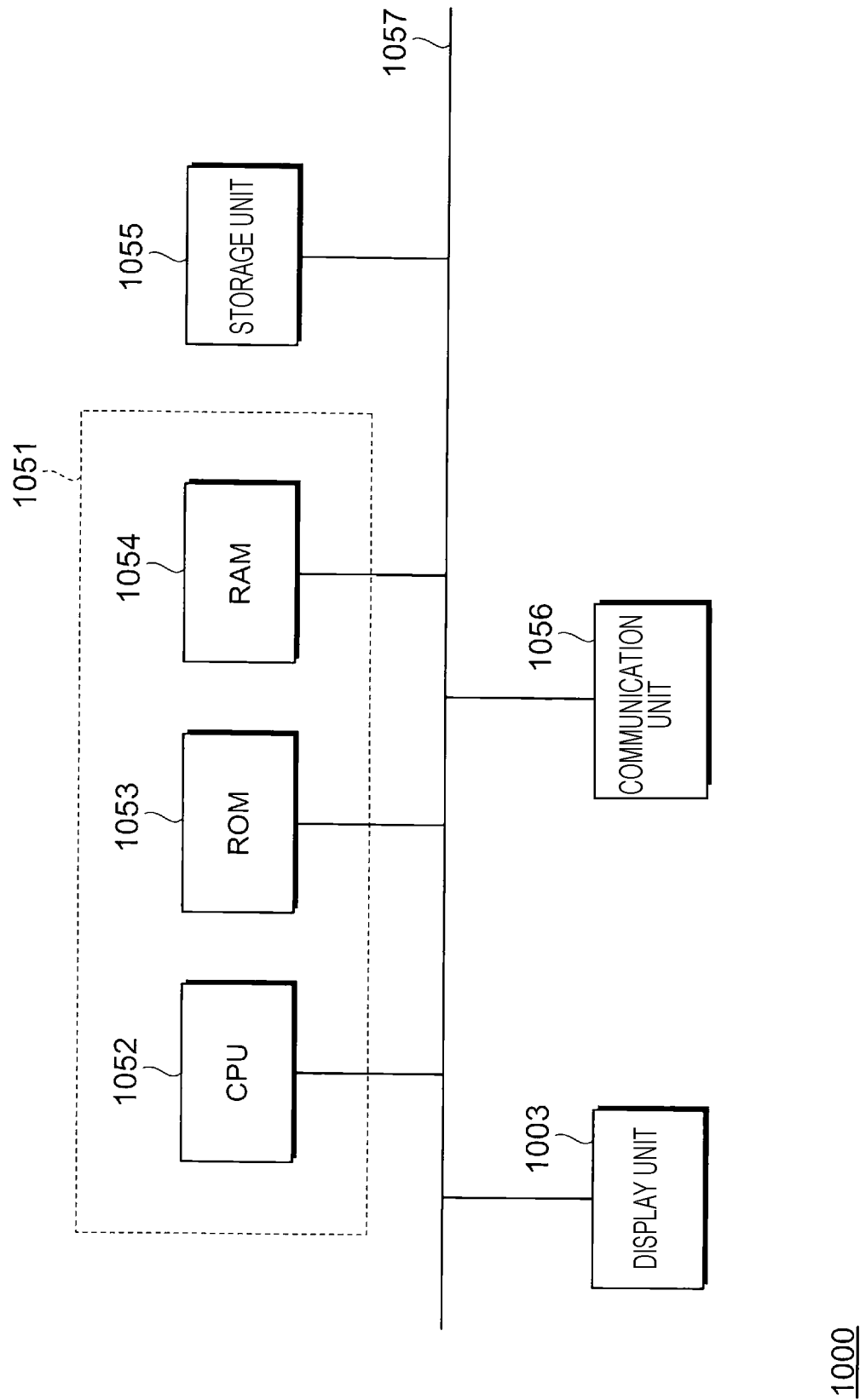
FIG. 32 illustrates a functional block example of a controller and other units constituting the information terminal.

FIG. 32 illustrates a functional block example of a controller 1051 and other units constituting the information terminal 1000. The information terminal 1000 has the controller 1051 that controls the entire device, the display unit 1003 used for displaying an image, a storage unit 1055 used for storing various types of data and programs, and a communication unit 1056 used for communicating with an external device (e.g., the operation reception unit 302).

These units are connected to one another via, for example, a bus 1057 and exchange data via the bus 1057.

The controller 1051 includes a CPU 1052, a ROM 1053, and a RAM 1054. The ROM 1053 stores a program to be executed by the CPU 1052. The CPU 1052 uses the RAM 1054 as a work area and executes the program loaded from the ROM 1053, whereby each unit of the information terminal 1000 is controlled.

The controller 1051 according to this exemplary embodiment provides a function as an input device together with the operation reception unit 302.

In this exemplary embodiment, the CPU 1052 functioning as an operation-input detection functioning unit uses a dedicated interface screen for inputting the installation position of the operation reception unit 302.

Figure 33:
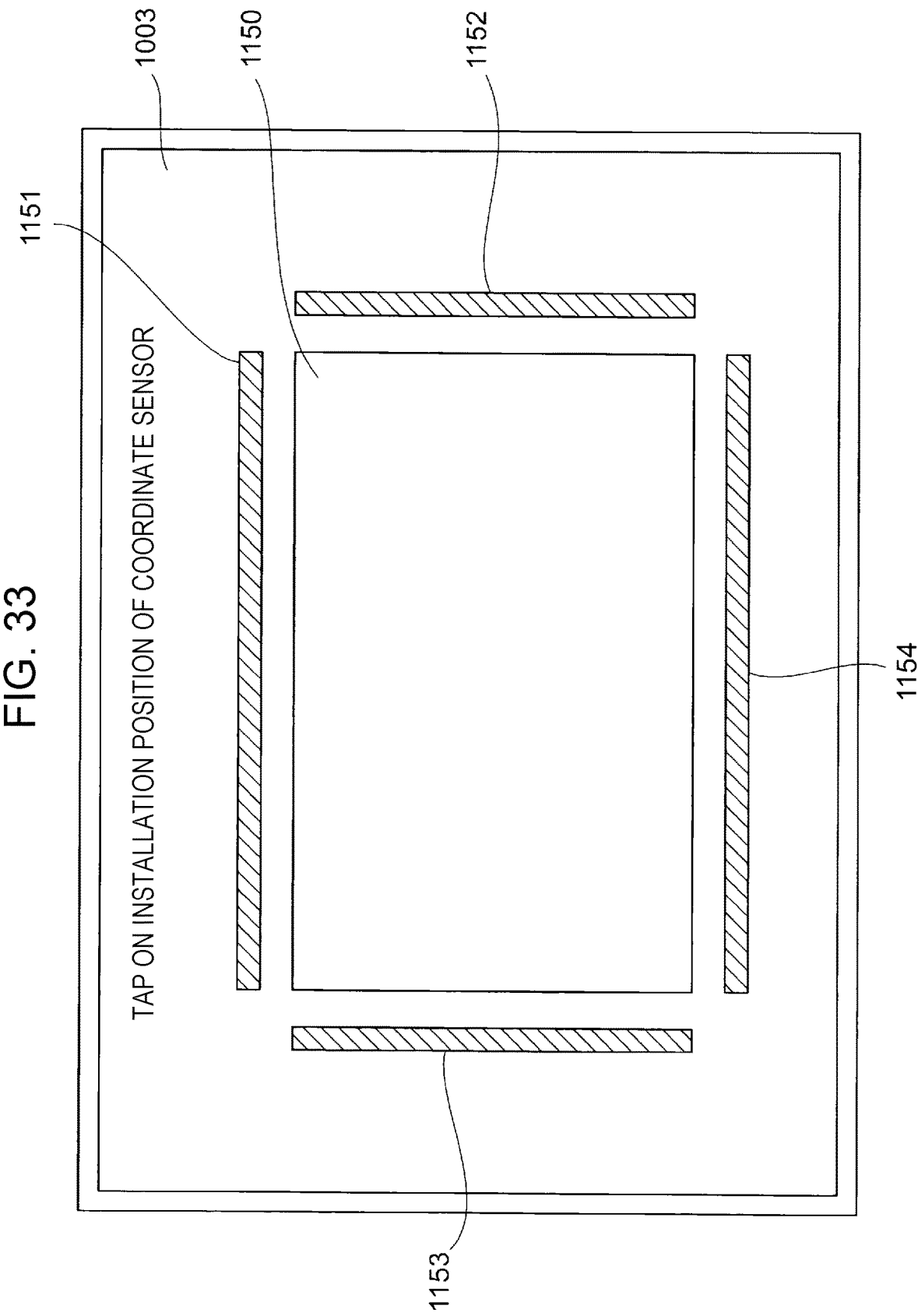
FIG. 33 illustrates an example of an interface screen displayed on the display unit for receiving the installation position of the operation reception unit.

FIG. 33 illustrates an example of the interface screen displayed on the display unit 1003 for receiving the installation position of the operation reception unit 302. In this case, the interface screen has installation-position candidates 1151 to 1154 respectively disposed at the four sides of a rectangle 1150 indicating the position of the display unit 1003.

Specifically, the installation-position candidate 1151 is disposed along the upper side of the rectangle 1150, the installation-position candidate 1152 is disposed along the right side of the rectangle 1150, the installation-position candidate 1153 is disposed at the left side of the rectangle 1150, and the installation-position candidate 1154 is disposed at the lower side of the rectangle 1150.

The interface screen displays a guidance message "tap on installation position of coordinate sensor". When the user taps on any one of the installation-position candidates on the screen in accordance with the guidance message, information about the tapped installation-position candidate is received as the position of the operation reception unit 302.

In this exemplary embodiment, after the operation reception unit 302 is installed, it is desirable that a correction operation be executed for associating the output coordinates of the operation reception unit 302 with the four sides of the display unit 1003.

The operation reception unit 302 has a height of, for example, 17 mm (i.e., a height from the installation surface). This numerical value is merely an example and may be, for example, 10 mm or larger. The same applies to other exemplary embodiments described above.

Accordingly, even when the positional relationship between the operation reception unit 302 and the display unit 1003 is variable (i.e., even when the detection region is variable), the position where an invisible button is to be allocated may be determined by the information terminal 1000 and be received as an operation input.

Other Exemplary Embodiments

Although exemplary embodiments of the present invention have been described above, the technical scope of the invention is not to be limited to the scope defined in the above exemplary embodiments. It is obvious from the scope of the claims that various modifications and variations added to the above exemplary embodiments are included in the technical scope of the invention.

In the above exemplary embodiments, the image forming apparatus 1 and the information terminals 700 and 1000 are exemplified as apparatuses to which the input device that uses the operation reception unit 302 is applied. Alternatively, the input device may be applied to, for example, a smartphone, a portable gaming device, a navigation device, a transport-ticket vending machine, a ticket vending machine, or an automatic teller machine.

What is claimed is:

1. An input device comprising:
   a display on which a work screen is displayed;
   a detector that detects an operation input; and
   a processor programmed to variably allocate a second operational function to a detection region of the detector, the second operational function being different from a first operational function, an allocation position of which is visually ascertainable, wherein
   a region to which the second operational function is allocated is outside the display, and
   notification that the second operational function is to be allocated to the outside of the display is performed.

2. The input device according to claim 1,
   wherein the allocation of the second operational function to the detection region is executed in accordance with a selecting operation performed by a user.

3. The input device according to claim 1,
   wherein the second operational function of a type selected by a user is allocated to the detection region.

4. The input device according to claim 1,
   wherein an allocation position of the second operational function in the detection region is selected by a user.

5. The input device according to claim 4,
wherein a size of a detection range linked with the second operational function is selected by the user.

6. The input device according to claim 1,
wherein the processor is further programmed to determine the second operational function to be allocated to the detection region in accordance with display contents on the work screen.

7. The input device according to claim 1,
wherein the processor is further programmed to determine the second operational function to be allocated to the detection region in accordance with a type of application being executed.

8. The input device according to claim 1,
wherein contents and an arrangement layout of the second operational function allocated to the detection region are displayed on the work screen.

9. The input device according to claim 1,
wherein a light source corresponding to an allocation position of the second operational function is lit.

10. The input device according to claim 1,
wherein a positional relationship between the detector and a device body is set in advance in a case where the detector is attachable to and detachable from the device body.

11. The input device according to claim 10,
wherein an installation position of the detector relative to the device body is received via a setting screen.

12. The input device according to claim 1,
wherein the detector is disposed alongside the display.

13. The input device according to claim 12,
wherein the detector has a length that is larger than an edge length of the display at a side at which the detector is disposed.

14. The input device according to claim 1, further comprising:
a movable member to which the second operational function is variably allocated.

15. The input device according to claim 1,
wherein the work screen displays a control button for printing a layout of the second operational function allocated to the detection region.

16. An image forming apparatus comprising:
an image forming unit that forms an image onto a recording medium;
a display on which a work screen is displayed;
a detector that detects an operation input; and
a processor programmed to variably allocate a second operational function to a detection region of the detector, the second operational function being different from a first operational function, an allocation position of which is visually ascertainable, wherein
a region to which the second operational function is allocated is outside the display, and
notification that the second operational function is to be allocated to the outside of the display is performed.

17. A non-transitory computer readable medium storing a program causing a computer to execute a process, the process comprising:
detecting an operation input;
variably allocating a second operational function to a detection region, the second operational function being different from a first operational function, an allocation position of which is visually ascertainable, a region to which the second operational function is allocated being outside a display on which a work screen is displayed; and
performing notification that the second operational function is to be allocated to the outside of the display.

* * * * *